(12) United States Patent
Wauke

(10) Patent No.: US 7,187,092 B2
(45) Date of Patent: Mar. 6, 2007

(54) THIN INNER ROTOR MOTOR FOR ROTATABLY DRIVING MEDIUM, AND DISK APPARATUS USING THE SAME

(75) Inventor: Tomokuni Wauke, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/042,068

(22) Filed: Jan. 8, 2002

(65) Prior Publication Data

US 2002/0089246 A1    Jul. 11, 2002

(30) Foreign Application Priority Data

| Jan. 9, 2001 | (JP) | ............................ 2001-001747 |
| Feb. 23, 2001 | (JP) | ............................ 2001-049346 |
| Feb. 23, 2001 | (JP) | ............................ 2001-049350 |

(51) Int. Cl.
  *H02K 37/24* (2006.01)

(52) U.S. Cl. .................... 310/49 R; 310/216; 310/254; 310/259

(58) Field of Classification Search ................ 310/216, 310/254, 255, 258, 259, 49 R, 185, 156.01–156.84, 310/152, 10, 46
  See application file for complete search history.

(56) References Cited

U.S. PATENT DOCUMENTS

| 1,386,609 A | * | 8/1921 | Elden ........................... 310/46 |
| 2,194,046 A | * | 3/1940 | Langer ......................... 310/46 |
| 2,492,435 A | * | 12/1949 | Ostline ........................ 318/254 |
| 2,538,216 A | * | 1/1951 | Stehlik ......................... 310/46 |
| 2,867,762 A | * | 1/1959 | Lehman et al. ............. 318/254 |
| 3,375,422 A | * | 3/1968 | Boudigues .................. 318/138 |
| 3,403,272 A | * | 9/1968 | Dold ............................ 310/12 |
| 3,629,632 A | * | 12/1971 | Loupe ........................... 310/74 |
| 3,786,291 A | * | 1/1974 | Sidell ........................... 310/162 |
| 3,909,643 A | * | 9/1975 | Kishima ...................... 310/68 R |
| 4,079,274 A | * | 3/1978 | Richmond .................... 310/51 |
| 4,160,435 A | * | 7/1979 | Sleder .......................... 123/599 |
| 4,255,696 A | * | 3/1981 | Field, II ...................... 318/696 |
| 4,315,171 A | * | 2/1982 | Schaeffer .................... 310/49 R |
| 4,459,087 A | * | 7/1984 | Barge .......................... 417/356 |
| 4,553,075 A | * | 11/1985 | Brown et al. ............... 318/254 |
| 4,563,622 A | * | 1/1986 | Deavers et al. ............. 318/254 |
| 4,564,793 A | * | 1/1986 | Reffelt ........................ 318/254 |
| 4,970,423 A | * | 11/1990 | Tamae et al. ............... 310/162 |
| 5,128,570 A | * | 7/1992 | Isozaki ....................... 310/49 R |
| 5,341,060 A | * | 8/1994 | Kawamura ................. 310/153 |
| 5,418,416 A | | 5/1995 | Müller ........................ 310/186 |
| 5,432,644 A | | 7/1995 | Tajima et al. ............. 360/99.04 |
| 5,610,492 A | * | 3/1997 | Leung et al. ............... 318/701 |
| 5,642,013 A | * | 6/1997 | Wavre ......................... 310/254 |
| 5,679,988 A | * | 10/1997 | Ito et al. ........................ 73/36 |
| 5,708,310 A | * | 1/1998 | Sakamoto et al. ........ 310/49 R |
| 5,859,486 A | | 1/1999 | Nakahara et al. ........... 310/254 |
| 6,043,574 A | * | 3/2000 | Prudham .................. 310/49 R |
| 6,078,467 A | | 6/2000 | Akutsu et al. ........... 460/99.08 |

(Continued)

FOREIGN PATENT DOCUMENTS

JP    4-178161    6/1992

(Continued)

*Primary Examiner*—Dang Le
(74) *Attorney, Agent, or Firm*—Brinks Hofer Gilson & Lione

(57) ABSTRACT

An inner rotor motor includes a rotor having a plurality of magnetic poles circumferentially arranged, and a stator with a stator core having a plurality of magnetic pole teeth that are positioned on the outer side of the circumference of the rotor and oppose the rotor. A coil is provided on each of the magnetic pole teeth. The stator extends not more than 180 degrees with respect to the center of the rotor.

43 Claims, 10 Drawing Sheets

U.S. PATENT DOCUMENTS

| | | | |
|---|---|---|---|
| 6,104,117 A * | 8/2000 | Nakamura et al. | 310/254 |
| 6,201,322 B1 * | 3/2001 | Heine et al. | 310/51 |
| 6,265,800 B1 * | 7/2001 | Kimura et al. | 310/152 |
| 6,429,565 B1 * | 8/2002 | Matsunobu et al. | 310/156.38 |
| 6,479,911 B1 * | 11/2002 | Koike et al. | 310/49 R |
| 6,548,923 B2 * | 4/2003 | Ohnishi et al. | 310/49 R |
| 6,552,451 B1 * | 4/2003 | Ikegami et al. | 310/49 R |
| 6,713,926 B2 * | 3/2004 | Wauke | 310/185 |
| 6,774,520 B2 * | 8/2004 | Wauke | 310/156.45 |

FOREIGN PATENT DOCUMENTS

| | | |
|---|---|---|
| JP | 041 781 49 | 6/1992 |
| JP | 100 708 70 | 3/1998 |

* cited by examiner

THIN INNER ROTOR MOTOR FOR ROTATABLY DRIVING MEDIUM, AND DISK APPARATUS USING THE SAME

BACKGROUND OF THE INVENTION

1. Field of the Invention

The present invention relates to a technology ideally used for a thin inner rotor motor for rotatably driving a medium that is used with, for example, a floppy disk drive unit or the like.

2. Description of the Related Art

A disk apparatus, such as a floppy disk unit, has been extensively used for a personal computer, an office computer, a word processor, etc., and has been showing remarkable widespread use. This type of disk apparatus is constructed, for example, as shown in FIG. 10.

The disk apparatus will be outlined in conjunction with FIG. 10. A chassis 101 has a spindle center 102 providing the rotational center of a disk, and is accommodated in an equipment housing (not shown) of, for example, a personal computer or the like. The chassis 101 is formed by a bottomed box that is opened frontward and upward and has a space for accommodating a disk cartridge 103.

At the rear end of the chassis 101, a stepping motor 124 for driving a head carriage, and the head carriage constructed to be moved back and forth by the stepping motor 124 are provided. A first head 130 for reading the information recorded on a disk is retained on the distal end of the head carriage, and a head arm 132 having a second head 131 associated with the first head 130 is attached to the rear upper end such that it may swing through the intermediary of an elastic member. The head arm 132 is urged such that the second head 131 is urged toward the first head 130. The disk apparatus in this example is provided with a cartridge holder 136 that removably holds the disk cartridge 103, and a device for opening and closing the shutter of the disk cartridge 103.

Some disk apparatuses of this type use an inner rotor motor shown in FIGS. 11A and 11B as the motor for rotating a disk in order to achieve a thinner design in recent years.

The inner rotor motor is constructed by a stator 164 that has an annular yoke 161 extending in the circumferential direction and multiple cores 163 which are radially provided on the inner circumferential surface of the yoke 161 and around which coils 162 are wound, and a rotor 166 having an annular magnet 165 which is rotatably provided on the inner circumferential surface of the stator 164 so that it opposes the cores 163. The inner rotor motor further includes a circuit board 168 on which a retaining assembly 170 that incorporates a bearing 169 is mounted, and a rotary shaft 171 for fixing the rotor which is rotatably supported by the retaining assembly 170 on the circuit board 168 through the intermediary of the bearing 169 and which has an axis extending in the vertical direction. The rotor 166 of the inner rotor motor functions as a turntable that has a disk chucking magnet (not shown) and a disk chucking rotary lever (not shown).

In the stator for this type of inner rotor motor, the yoke 161 and the cores 163 are provided such that they surround substantially the whole circumference of the circular rotor 166 except for the portion wherein the heads 130 and 131 move. In order to meet magnetic characteristics requirements, the stator is formed of silicon steel or the like that is more costly than a galvanized steel plate constituting the chassis 101, etc.

For this type of disk apparatus, however, there has been a constant demand for reduced manufacturing cost, and also a high demand for a smaller size and a reduced weight of the disk apparatus. Hence, a demand exists for reducing the areas of the yoke 161 and the cores 163 formed of the costly silicon steel in the stator for the inner rotor motor.

If, however, the areas of the yoke 161 and the cores 163 are reduced to meet the aforesaid demand, then the magnetic interaction relative to the rotor 166 may become uneven in the circumferential direction, adversely affecting the operational stability of a disk.

In addition, another problem exists. When an attempt is made to reduce the size and weight of a floppy disk drive unit or the like, the possibility increases in which the magnetic head for writing and reading magnetic information from and to a medium, such as a floppy disk, is brought excessively close to the magnet of the rotor, and the magnetic fluxes from the magnet of the rotor 166 to the magnetic head adversely affect the writing and reading of the magnetic information.

Furthermore, the magnetic fluxes that enter into the chassis 101 from the magnetic poles of the rotor 166 cause a force to act between the rotor 166 and the chassis 101. This consequently causes an applied thrusting force to push the rotor 166 against the chassis 101, possibly leading to deteriorated rotation of the rotor 166. On the other hand, if the thrusting force for pushing the rotor 166 against the chassis 101 is too weak, then the rotational stability of the rotor 166 deteriorates. Therefore, there has been a demand for controlling the thrusting force to remain within a preferable range.

SUMMARY OF THE INVENTION

In view of the above, the present invention has been made to attain the objectives shown below:

(1) To reduce the manufacturing cost;
(2) To reduce the size and weight of an apparatus;
(3) To maintain the rotational stability of a motor;
(4) To improve the operational stability of a disk apparatus;
(5) To reduce the influences of the magnetic fluxes from a rotor on a magnetic head or the like positioned around the rotor; and
(6) To control the thrusting force applied to the rotor.

To this end, according to one aspect of the present invention, there is provided an inner rotor motor including: a rotor having a plurality of magnetic poles circumferentially arranged; and a stator that has a stator core having a plurality of magnetic pole teeth that are positioned on the outer side of the circumference of the rotor and oppose the rotor, a coil being provided on each of the magnetic pole teeth, wherein the stator is provided to an extent of 180 degrees or less with respect to the central angle of the rotor.

Further preferably, the stator is provided to an extent of 90 degrees or less with respect to the central angle of the rotor.

A magnetic balancer for securing magnetic balance between the rotor and the stator may be provided on the outer side of the circumference of the rotor.

The magnetic balancer may be made integral with a chassis to which the rotor is rotatably installed and which is formed of a magnetic material.

The magnetic balancer is constituted by a plurality of segments arranged in the circumferential direction of the rotor. Hence, when the magnetic balancer and the chassis are formed by press-bending, the stress that influences the bottom surface of the chassis can be reduced.

Preferably, the sum of the quantities of magnetic fluxes going in and out of the magnetic balancer from the rotor and the sum of the quantities of magnetic fluxes going in and out of magnetic pole teeth of the stator from the rotor are set to be equal.

The disposition of the magnetic balancer in relation to the circumference of the rotor and the disposition of the magnetic pole teeth in relation to the circumference of the rotor may be set so that they are point-symmetrical with respect to the center of the rotor.

The lengths of the magnetic balancer and the magnetic pole teeth provided at the positions where they are point-symmetrical with respect to the center of the rotor may be set such that they respectively occupy equal lengths on the circumference of the rotor.

Preferably, six pieces of the magnetic pole teeth are provided.

According to another aspect of the present invention, there is provided a disk apparatus equipped with the inner rotor motor described above.

The inner rotor motor according to the present invention has a stator provided to an extent of 180 degrees or less with respect to the central angle of the rotor. This arrangement makes it possible to reduce the area of the stator core to approximately half or less, as compared with a structure in which the stator is provided over the full circumference of the rotor as in the case of a conventional inner rotor motor. Therefore, the cost for the stator core formed of, for example, a silicon steel plate, and the cost for coil windings, etc. can be reduced so as to reduce the manufacturing cost for the inner rotor motor. At the same time, as compared with the case where the stator is provided over the full circumference of the rotor, the area required for installing the motor can be reduced to achieve a reduced size, and the weight can be also reduced because the number of the magnetic pole teeth can be reduced. The stator may be continuously provided up to 180 degrees with respect to the central angle, or may be formed in a plurality of stator segments with intervals provided therebetween as long as the total sum of the central angles of the portions where the stator segments are provided stays within 180 degrees.

Providing the stator to an extent of 90 degrees or less with respect to the central angle of the rotor makes it possible to further reduce the manufacturing cost, weight, and size.

The magnetic balancer for securing magnetic balance between the rotor and the stator is provided on the outer side of the circumference of the rotor. Therefore, even if the stator is disposed only on one side of the rotor and the rotor is driven only from the one side of the rotor, the force acting on the rotor can be symmetrized in good balance with respect to the rotary shaft of the rotor. Thus, the stability of the rotative drive of the rotor can be maintained.

The magnetic balancer is made integral with the chassis to which the rotor is rotatably installed and which is formed of a magnetic material. Hence, when a chassis made of, for example, a galvanized steel plate is manufactured, the magnetic balancer and the chassis can be formed at the same time by bending and raising the portion at under the rotor toward the rotor mounting side by press-cutting. With this arrangement, the manufacturing process can be simplified and the material cost can be saved, permitting reduced manufacturing cost, as compared with the case where a separate member is installed as the magnetic balancer.

Furthermore, the magnetic balancer is formed by a plurality of segments arranged in the circumferential direction of the rotor. Hence, as set forth above, when the chassis formed of, for example, the galvanized steel plate is bent and raised, the influences on the surface of the chassis to which the rotor is installed can be restrained so as to control deformation or the like. Moreover, when the magnetic balance is set for the magnetic pole teeth arranged in the circumferential direction of the rotor with spaces provided therebetween, the symmetry of the magnetic balancer with respect to the magnetic pole teeth can be easily obtained.

The sum of the quantities of magnetic fluxes going in and out of the magnetic balancer from the rotor is set to be equal to the sum of the quantities of magnetic fluxes going in and out of magnetic pole teeth of the stator from the rotor. With this arrangement, the action applied to the rotor by the magnetic balancer and the magnetic pole teeth can be symmetrically set with greater ease. To be more specific, a means may be used whereby the sum of the lengths of the magnetic balancers that occupy the circumference of the rotor and the sum of the lengths of the magnetic pole teeth of the stator that occupy the circumference of the rotor are set to be equal.

The disposition of the magnetic balancer in relation to the circumference of the rotor and the disposition of the magnetic pole teeth in relation to the circumference of the rotor are set so that they are symmetrical with respect to the rotational center of the rotor. This arrangement makes it possible to symmetrically set the action applied to the rotor by the magnetic balancer and the magnetic pole teeth with greater ease.

The lengths of the magnetic balancer and the magnetic pole teeth provided at the positions where they are point-symmetrical with respect to the center of the rotor are set so that they respectively occupy equal lengths on the circumference of the rotor. This arrangement makes it possible to symmetrically set the action applied to the rotor by the magnetic balancer and the magnetic pole teeth with greater ease when designing a magnetic circuit.

The six magnetic pole teeth are installed, providing the compatibility with a three-phase inner rotor motor.

The height of the magnetic balancer from the chassis is set, considering the influences exerted on the stability of the rotational operation of the rotor, and a cartridge supporting portion is provided on the distal end of the magnetic balancer, the cartridge supporting portion being set to be higher than the rest and projecting above the rotative surface of the rotor. With this arrangement, the disk cartridge of a floppy disk or the like can be set such that it does not come in contact with the rotor.

According to yet another aspect of the present invention, there is provided an inner rotor motor having: a rotor having a plurality of magnetic poles circumferentially arranged, and a stator that has a stator core having a plurality of magnetic pole teeth that are positioned on the outer side of the circumference of the rotor and oppose the rotor, a coil being provided on each of the magnetic pole teeth, the inner rotor motor further including: a portion wherein the stator is provided around the rotor to an extent of 180 degrees or less with respect to the central angle of the rotor; and a portion wherein a magnetic shield for blocking magnetic fluxes from the rotor is provided.

The magnetic shield may be made integral with a chassis to which the rotor is rotatably installed and which is formed of a magnetic material.

The distance between the magnetic shield and the circumference of the rotor may be set such that the distance are larger at both ends of the magnetic shield, as compared with that at the center of the magnetic shield.

Preferably, the magnetic shield is provided such that it linearly extends in the tangential direction of the circumference of the rotor.

The length of the magnetic shield in the circumferential direction of the rotor may be set to be shorter than the circumferential length of two magnetic poles of the rotor.

A magnetic balancer for securing magnetic balance between the rotor and the magnetic shield may be provided on the outer side of the circumference of the rotor.

The disposition of the magnetic balancer may be set in relation to the circumference of the rotor and the disposition of the magnetic shield in relation to the circumference of the rotor such that they are point-symmetrical with respect to the center of the rotor.

According to a further aspect of the present invention, there is provided a disk apparatus equipped with the inner rotor motor described above and a magnetic head, wherein the magnetic shield blocks magnetic fluxes from the rotor to the magnetic head.

According to the present invention, the stator is provided to an extent of 180 degrees or less with respect to the central angle of the rotor. This arrangement makes it possible to reduce the area of the stator core to approximately half or less, as compared with a structure in which the stator is provided over the full circumference of the rotor as in the case of a conventional inner rotor motor. Therefore, the cost for the stator core formed of, for example, a silicon steel plate and the cost for coil windings, can be reduced so as to reduce the manufacturing cost for the inner rotor motor. At the same time, as compared with the case where the stator is provided over the full circumference of the rotor, the area required for installing the motor can be reduced to achieve a reduced size, and the weight can be also reduced because the number of the magnetic pole teeth can be decreased. In this state, a portion is provided wherein a magnetic shield for blocking magnetic fluxes from the rotor is disposed. Hence, when a magnetic head or the like is provided in the vicinity of the rotor, the magnetic shield will be positioned between the magnetic head or the like and the rotor thereby to block the magnetic fluxes from the rotor to the magnetic head or the like, making it possible to reduce the influences of the magnetic poles of the rotor exerted on the magnetic head or the like. As a result, the magnetic head or the like can be provided at a position closer to the rotor, permitting a further compact design to be achieved.

The magnetic shield for blocking the magnetic fluxes from the rotor can be applied to a structure other than the magnetic head as long as it is subjected to the influences of the magnetic fluxes from the rotor.

Forming the magnetic shield integral with the chassis to which the rotor is rotatably installed and which is formed of a magnetic material makes it possible to form the magnetic shield and a chassis at the same time by bending and raising the portion at under the rotor toward the rotor mounting side by press-cutting when the chassis made of, for example, a galvanized steel plate is manufactured. With this arrangement, the manufacturing process can be simplified and the material cost can be saved, permitting reduced manufacturing cost, as compared with the case where a separate member is installed as the magnetic shield.

According to the present invention, the distance between the magnetic shield and the circumference of the rotor is set such that the distance is larger at both ends of the magnetic shield, as compared with that at the center of the magnetic shield. Therefore, even if the length of the magnetic shield, i.e., the dimension thereof in the circumferential direction of the rotor, does not coincide with an even multiple number of the length of the magnetic pole (magnet) of the rotor in the circumferential direction, the magnetic fluxes entering into the magnetic shield from the magnet of the rotating rotor can be asymptotically increased or decreased. This allows cogging to be restrained.

The magnetic shield is provided such that it linearly extends in the tangential direction of the circumference of the rotor. With this arrangement, when the magnetic shield and the chassis are formed by press-bending, the stress that influences the bottom surface of the chassis can be reduced, permitting dimensional accuracy in the forming process to be achieved.

The circumferential length of the rotor in the magnetic shield is set to be shorter than the circumferential length of two magnetic poles of the rotor. With this arrangement, the notch formed in the bottom of the chassis to correspond to the magnetic shield does not have to be made larger than necessary. Hence, it is possible to maintain the strength of the chassis at a predetermined level and to easily set the amount of magnetic fluxes entering into the bottom of the chassis from the rotor.

The magnetic balancer for securing magnetic balance between the rotor and the magnetic shield is provided on the outer side of the circumference of the rotor. With this arrangement, even if the magnetic shield is provided only on one side of the rotor to block the magnetic fluxes from the rotor, the force acting on the rotor can be symmetrized in good balance with respect to the rotary shaft of the rotor. Hence, the stability of the rotational drive of the rotor can be maintained.

The disposition of the magnetic balancer in relation to the circumference of the rotor and the disposition of the magnetic shield in relation to the circumference of the rotor are set so that they are point-symmetrical with respect to the center of the rotor. This arrangement makes it possible to set the sum of the quantities of magnetic fluxes going in and out of the magnetic balancer from the rotor to be equal to the sum of the quantities of magnetic fluxes going in and out of magnetic shield from the rotor. This allows the action applied to the rotor by the magnetic balancer and the magnetic shield to be symmetrically set with greater ease.

The lengths of the magnetic balancer and the magnetic shield provided at the positions where they are point-symmetrical with respect to the center of the rotor are set so that they respectively occupy equal lengths on the circumference of the rotor. This arrangement makes it possible to symmetrically set the action applied to the rotor by the magnetic balancer and the magnetic shield more easily when designing a magnetic circuit.

The heights of the magnetic shield and the magnetic balancer from the chassis are set, considering the influences exerted on the blocking of magnetic fluxes and the stability of the rotational operation of the rotor. Furthermore, cartridge supporting portions are provided on the distal ends of the magnetic shield and the magnetic balancer, the cartridge supporting portions being set higher than the rest to project above the rotative surface of the rotor. With this arrangement, the disk cartridge of a floppy disk or the like can be set such that it does not come in contact with the rotor.

According to another aspect of the present invention, there is provided an inner rotor motor including: a rotor having a plurality of magnetic poles circumferentially arranged, and a stator that has a stator core having a plurality of magnetic pole teeth that are positioned on the outer side of the circumference of the rotor and oppose the rotor, a coil being provided on each of the magnetic pole teeth, wherein the stator is provided to an extent of 180 degrees or less with respect to the central angle of the rotor, and a chassis to which the rotor is rotatably installed and which is formed of a magnetic material is provided with an interaction setting device that sets a force acting between the rotor and the chassis, the interaction setting device being disposed at under the rotational position of the magnetic poles of the rotor.

Preferably, the interaction setting device is formed of a notch provided in the chassis. The device may be provided with a plurality of the notches, the notches being set so as to be point-symmetrical with respect to the center of the rotor.

Preferably, a magnetic balancer for securing magnetic outer side of the circumference of the rotor, and the notches are provided such that they are in contact with the magnetic balancer. In addition, the magnetic balancer is preferably made integral with the chassis.

Further preferably, a magnetic shield for blocking magnetic fluxes from the rotor is provided on the outer side of the circumference of the rotor, and the notches provided such that they are in contact with the magnetic shield. Furthermore, the magnetic shield is preferably made integral with the chassis.

A magnetic balancer for securing magnetic balance between the rotor and the magnetic shield may be provided on the outer side of the circumference of the rotor. The notches may be provided such that they are in contact with the magnetic balancer, or the magnetic balancer may be made integral with the chassis.

The notches may continue to the outer side of the rotational position of the rotor, and the notches partly accommodate the coils of the stator.

The chassis to which the rotor is rotatably installed and which is formed of a magnetic material is provided with a notch serving as an interaction setting device disposed under the rotational position of the magnetic poles of the rotor so as to set the amount of the magnetic fluxes entering into the chassis from the magnetic poles of the rotor to a predetermined value and to set the force acting between the rotor and chassis to a suitable level, thereby setting the thrusting force that acts on the rotor to a desirable level. This makes it possible to restrain deterioration of the rotating performance caused by an excessive thrusting force directed to the chassis and applied to the rotor, or the deterioration of the rotational stability caused by an insufficient thrusting force directed to the chassis and applied to the rotor.

The use of the device provided with a plurality of notches, the notches being set to be point-symmetrical with respect to the center of the rotor, makes it possible to set the magnetic fluxes entering into the chassis from the magnetic poles of the rotor such that the magnetic fluxes are symmetrical with respect to the rotational center of the rotor. This sets the force acting on the rotor to be symmetrical with respect to the rotational center of the rotor. With this arrangement, the stability of the rotation of the rotor can be maintained.

The magnetic balancer for securing the magnetic balance between the rotor and the stator is provided on the outer side of the circumference of the rotor, the notch is provided in contact with the magnetic balancer, and the magnetic balancer is made integral with the chassis. Hence, when a chassis made of, for example, a galvanized steel plate is manufactured, the magnetic balancer, the notch, and the chassis can be formed at the same time by bending and raising the portion at under the rotor toward the rotor mounting side by press-cutting. With this arrangement, the manufacturing process can be simplified and the material cost can be saved, permitting reduced manufacturing cost, as compared with the case where a separate member is installed as the magnetic balancer.

More preferably, the magnetic shield for blocking the magnetic fluxes from the rotor is provided on the outer side of the circumference of the rotor, and the notch is provided in contact with the magnetic shield. Furthermore, the magnetic shield is made integral with the chassis. Hence, when a chassis made of, for example, a galvanized steel plate is manufactured, the magnetic shield, the notch, and the chassis can be formed at the same time by bending and raising the portion at under the rotor toward the rotor mounting side by press-cutting. With this arrangement, the manufacturing process can be simplified and the material cost can be saved, permitting reduced manufacturing cost, as compared with the case where a separate member is installed as the magnetic shield.

The magnetic balancer for securing the magnetic balance between the rotor and the stator is provided on the outer side of the circumference of the rotor, the notch is provided in contact with the magnetic balancer, and the magnetic balancer is made integral with the chassis. Hence, when a chassis made of, for example, a galvanized steel plate is manufactured, the magnetic balancer, the notch, and the chassis can be formed at the same time by bending and raising the portion at under the rotor toward the rotor mounting side by press-cutting. With this arrangement, the manufacturing process can be simplified and the material cost can be saved, permitting reduced manufacturing cost, as compared with the case where a separate member is installed as the magnetic balancer.

The notches continue to the outer side of the rotational position of the rotor, and the notches partly accommodate the coils in the stator. Thus, the windings of the coils are thicker than the magnetic pole teeth of the stator and the yokes to which the magnetic pole teeth are connected. By positioning the coils in the notches, the thickness of the inner rotor motor can be reduced so as to make the motor smaller.

At the same time, the distal ends of the magnetic pole teeth that oppose the rotor are positioned more closely to the bottom surface of the chassis than the magnetic pole of the rotor. Thus, as shown in FIG. 2B, which will be discussed hereinafter, a force F3 directed to the bottom surface of a chassis 1 is applied to a rotor 2 between itself and a stator 3 so as to allow the rotation of the rotor to be stabilized. Moreover, by setting the force F3 to an appropriate level, it is possible to restrain the deterioration of driving performance due to friction or the like attributable to an increase in the thrusting force in the rotary shaft of the rotor.

DESCRIPTION OF THE PREFERRED EMBODIMENTS

The following will describe an inner rotor motor and a disk apparatus according to an embodiment of the present invention in conjunction with the accompanying drawings.

Figure 1:
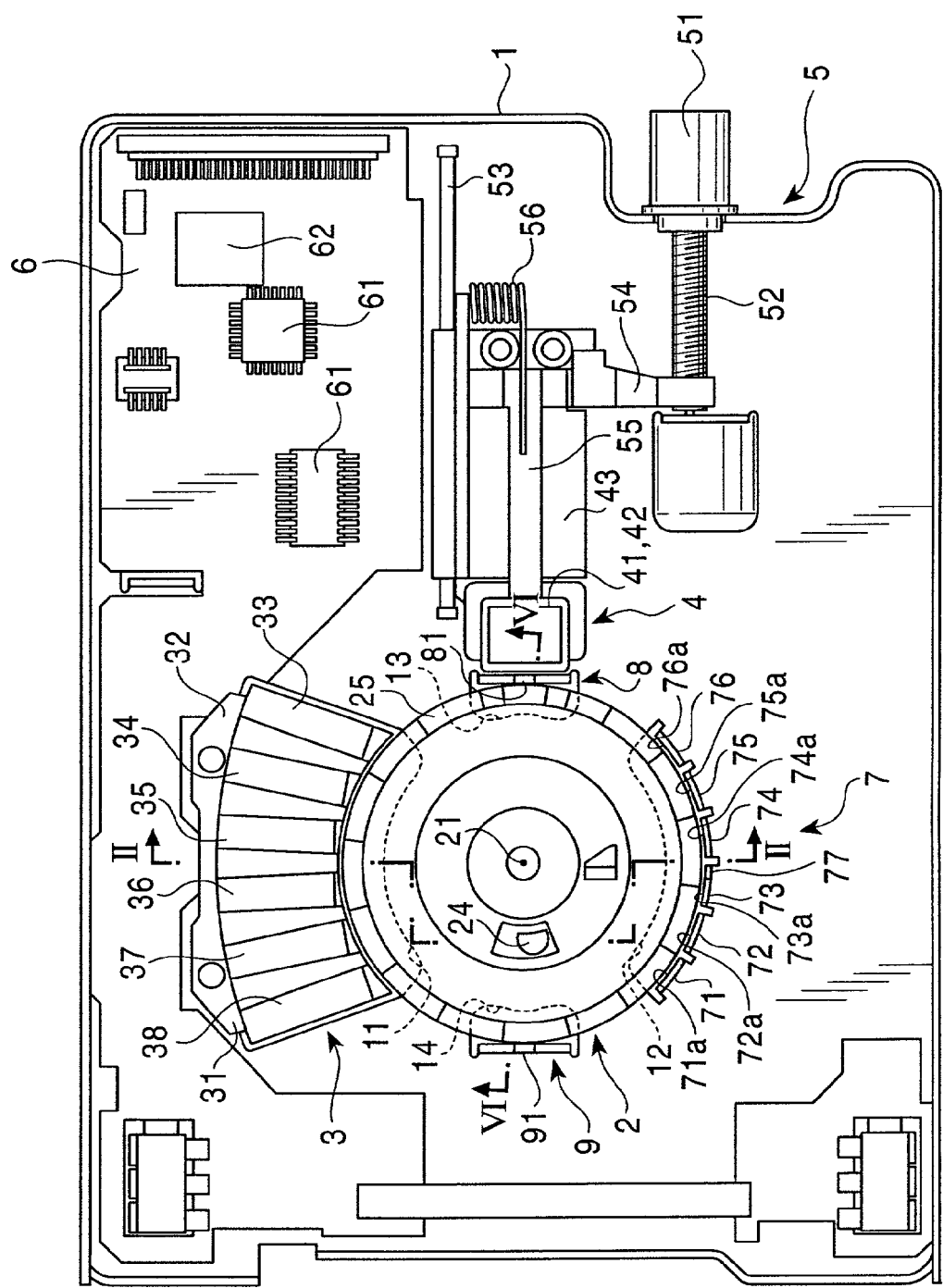
FIG. 1 is a plan view showing an inner rotor motor and a disk apparatus according to an embodiment of the present invention.

FIG. 1 is a plan view showing a part of the disk apparatus in accordance with the embodiment. Reference numeral 1 in the drawing denotes a chassis partly constituting the housing of the disk apparatus.

The disk apparatus according to the embodiment is an example used as a floppy disk drive (FDD).

Referring to FIG. 1, a chassis 1 formed of a galvanized steel plate or the like is provided with a rotor 2 and a stator 3 in an inner rotor motor for rotating a magnetic recording medium (disk), a magnetic head assembly 4 for reading/writing magnetic signals from/to the disk, a position controller 5 for controlling the position of the magnetic head assembly 4, a board 6 serving as a controller for controlling the position controller 5 and the drive of the inner rotor motor, a magnetic balancer 7, a magnetic shield 8, and a magnetic balancer 9.

Figure 2A:
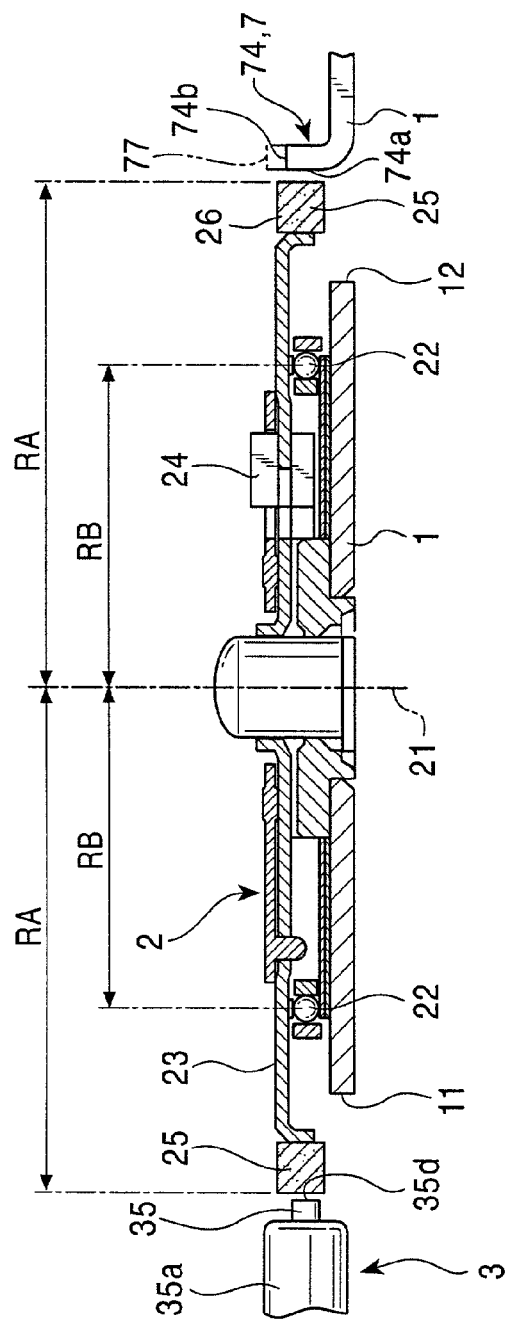
FIG. 2A is a fragmentary sectional view taken at the line II—II of the inner rotor motor shown in FIG. 1.
Figure 2B:
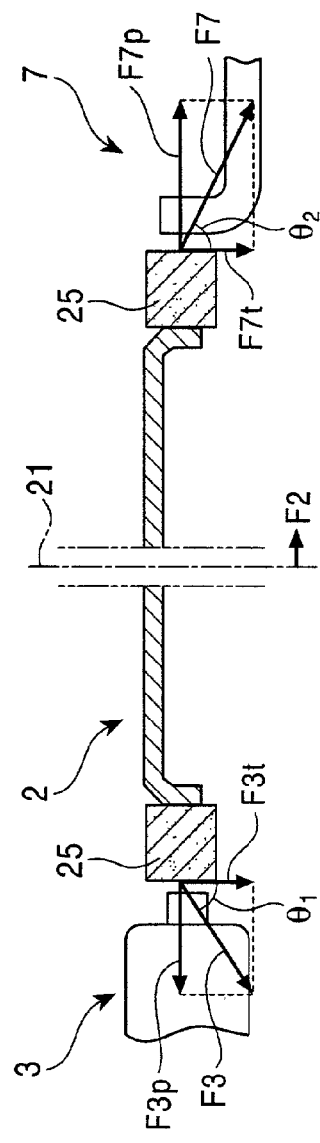
FIG. 2B is an enlarged sectional view showing the neighborhood of a magnet 25 in FIG. 2A.

FIG. 2A is a fragmentary sectional view taken at the line II—II of the inner rotor motor shown in FIG. 1, and FIG. 2B is an enlarged sectional view showing the neighborhood of a magnet 25 in FIG. 2A.

As shown in FIGS. 1 and 2, the rotor 2 includes a disc 23 rotatably supported primarily by bearings 22, 22 such that it rotates around a spindle center 21, which is secured to the bottom surface of the chassis 1, along a plane parallel to the bottom surface of the chassis 1. The rotor 2 further includes an engaging protuberance 24 that projects on the top surface of the disc 23 and engages in the engaging hole of a floppy disk to transmit a rotative driving force, and a magnet 25 provided with a thickness on the rim of the disc 23 and magnetized to circumferentially form a plurality of magnetic poles.

Figure 5:
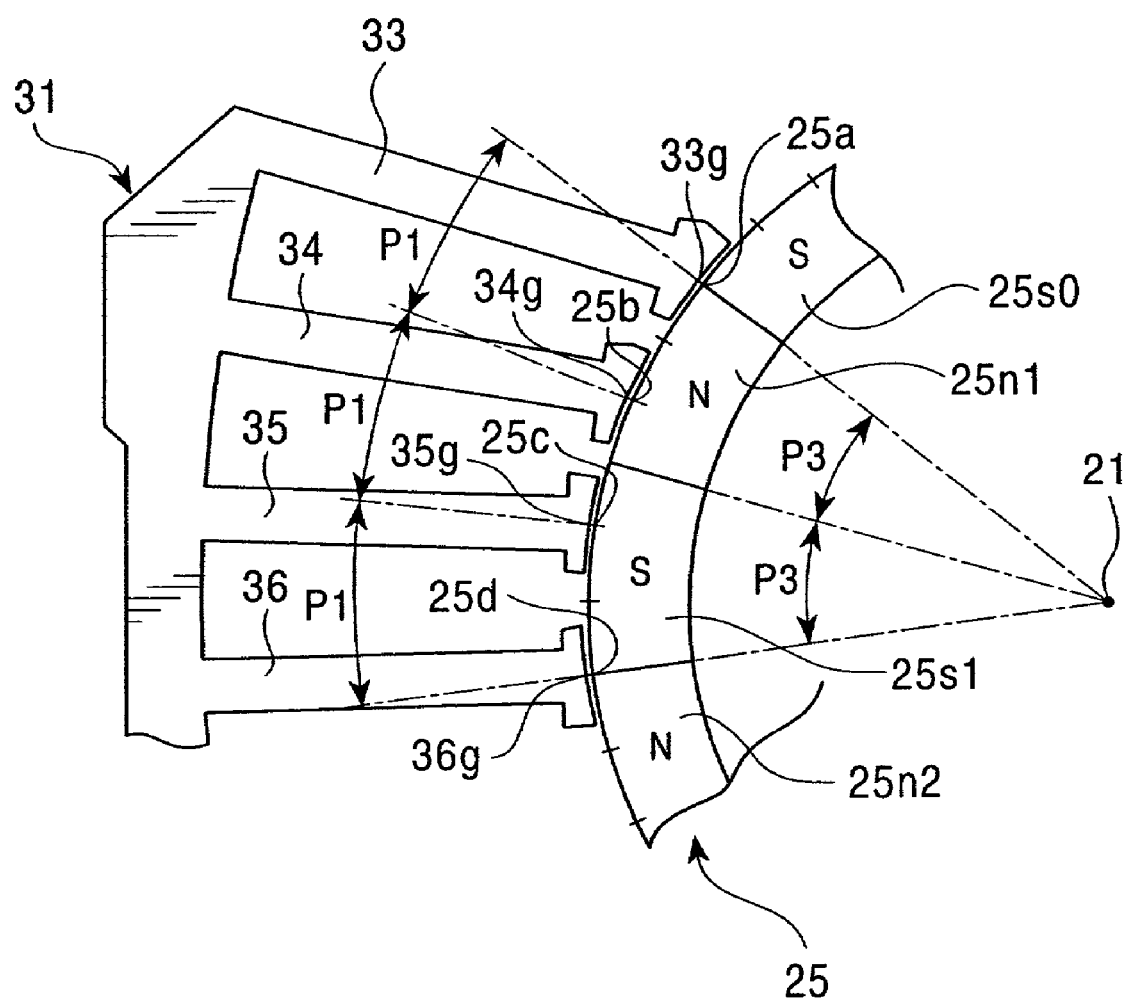
FIG. 5 is a schematic plan view illustrating the relationship between the magnet 25 and the magnetic pole teeth 33 through 38 in FIG. 1.

Referring to FIGS. 1 and 5, the magnet 25 has the north poles and the south poles that are alternately arranged in the circumferential direction. The total number of the magnetic poles is set, for example to sixteen. This means that magnetic poles 25n, 25s, and so on are arranged at intervals of 22.5 degrees with respect to the rotation center 21.

Figure 3:
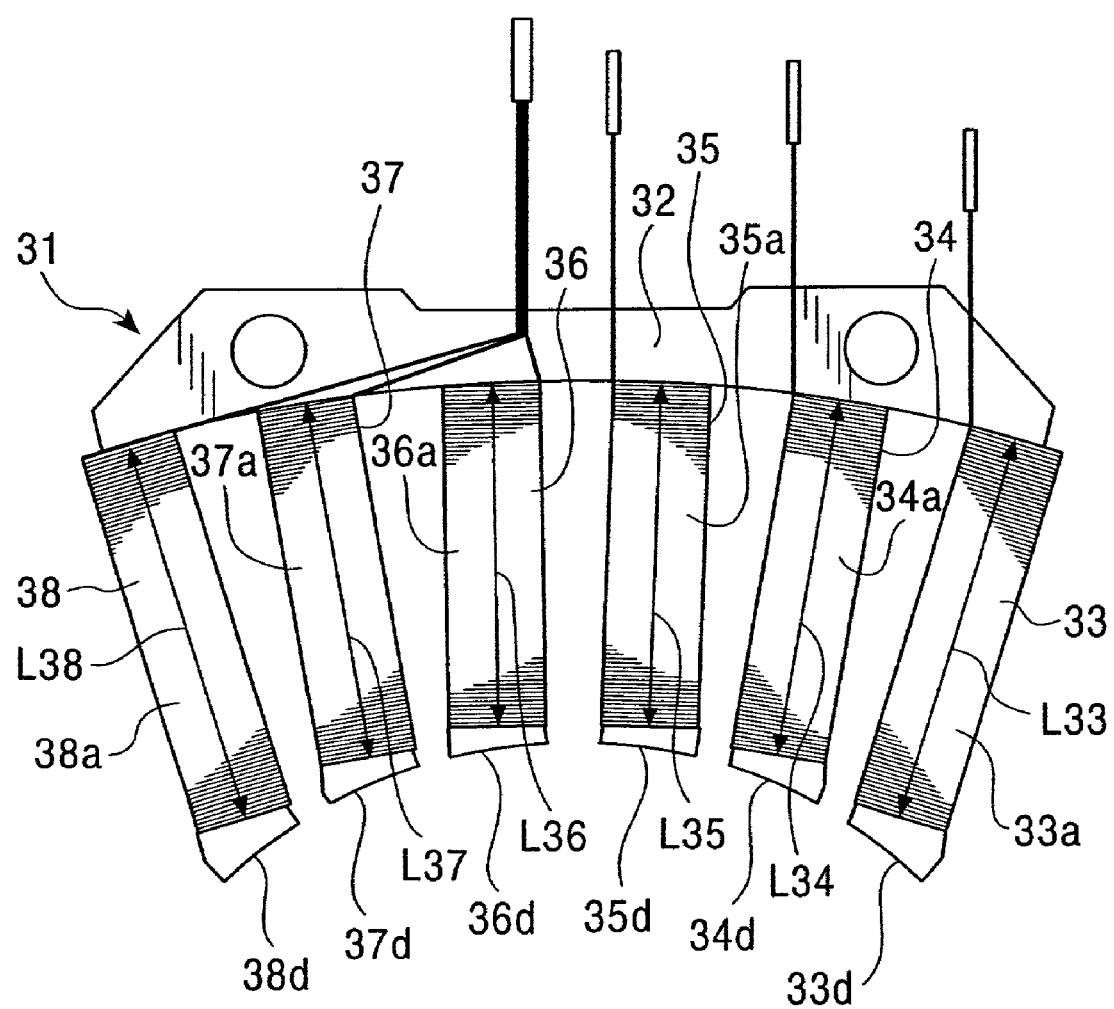
FIG. 3 is a plan view showing a stator 3 in FIG. 1.

FIG. 3 is a plan view showing the stator 3 in FIG. 1.

Referring now to FIGS. 1, 2, and 3, the stator 3 has a yoke 32 and a stator core 31 formed of six magnetic pole teeth 33, 34, 35, 36, 37, and 38 coupled by the yoke 32. All the magnetic pole teeth 33 through 38 are provided with windings formed into coils 33a through 38a. The stator 3 is attached to the chassis 1 by the yoke 32, and positioned such that the coils 33a through 38a fit to a notch 11 of the chassis 1 that is provided such that it extends sideways from under the rotational position of the rotor 2.

The notch 11 is formed from the position where the stator core 31 is installed to the chassis 1 to the point below the rotational position of the magnet 25 of the rotor 2 so as to accommodate the coils 33a through 38a therein. The notch 11 is formed to have a shape that allows the coils 33a through 38a to be accommodated therein, considering the positional relationship to notches 12, 13, and 14, which will be discussed hereinafter, and the strength of the chassis 1.

The contour shape of the notch 11 at the position under the rotational position of the rotor 2 is set such that it is symmetrical, about the rotation center 21, to the contour shape of the notch 12 (which will be discussed hereinafter) at the position under the rotational position of the rotor 2. By setting the above contour shape and also the shapes of the stator core 31 and the magnetic balancer 7, which will be described hereinafter, it becomes possible to set the downward thrusting force acting on the rotor 2 due to the magnetic fluxes from the magnet 25, which enter the bottom surface of the chassis 1, in the direction of the straight line that passes the stator 3 and the magnetic balancer 7.

Similarly, the notches 13 and 14 are shaped such that their contours at the position under the rotational position of the rotor 2 are symmetrical with respect to the rotation center 21. By setting the above contour shapes and also the shapes of the magnetic shield 8 and a magnetic balancer 9, which will be described hereinafter, it becomes possible to set the downward thrusting force acting on the rotor 2 due to the magnetic fluxes from the magnet 25, which enter the bottom surface of the chassis 1, in the direction of the straight line that passes the magnetic shield 8 and the magnetic balancer 9.

The notches 11, 12, 13, and 14 make up an interaction setting device for setting the force acting between the rotor 2 and the chassis 1. The setting of the interaction involves not only the notches 11, 12, 13, and 14, but also the shapes of the magnetic pole teeth 33 through 38 (which will be discussed hereinafter), the magnetic shield 8, and the magnetic balancers 7 and 9.

The shape of the stator core 31 will now be described.

Figure 4:
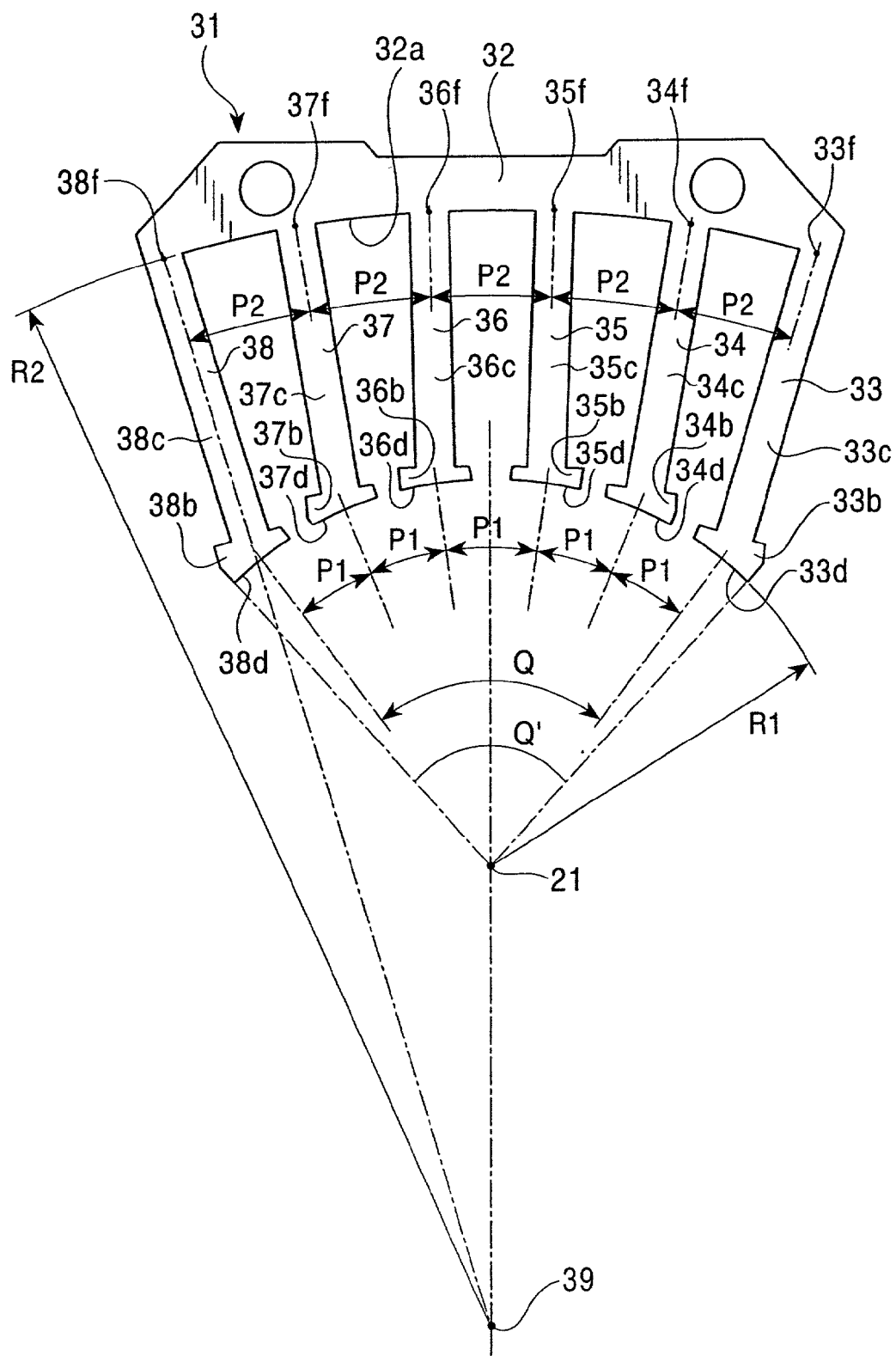
FIG. 4 is a plan view showing a stator core 31 in FIG. 1.

FIG. 4 is a plan view showing the stator core 31 in FIG. 1.

The stator core 31 is formed of a silicon steel plate. As shown in FIG. 1 through FIG. 4, the magnetic pole teeth 33 through 38 are provided with distal end portions 33b through 38b that extend beyond the coils 33a through 38a, respectively, toward the rotor 2, and winding portions 33c through 38c around which the coils 33a through 38a are wound.

The winding portions 33c through 38c are formed to have an even width over the entire lengths thereof. The distal end portions 33b though 38b are formed to be wider than the winding portions 33c through 38c. The distal portions 33b through 38b are provided with rotor-opposing surfaces 33d through 38d that are arcuate as observed from above and oppose the magnet 25 of the rotor 2 substantially with the same interval therebetween.

As shown in FIG. 2, the stator core 31 is provided such that the distal end portions 33b through 38b are lower than the magnet 25 of the rotor 2. More specifically, the positions of the centers of the distal end portions 33b through 38b in the height direction (the direction along the rotational axis of the rotor 2) are closer to the bottom surface of the chassis 1 than to the position of the center of the magnet 25 in the height direction. At the same time, the coils 33a through 38a are located in the notch 11 of the chassis 1.

The difference in the position of the center in the height direction between the distal end portions 33b through 38b and the magnet 25 is set so as to set the downward thrusting load toward the chassis 1 to maintain the stability of the rotation of the rotor 2, as in the case of the setting of the height of the magnetic balancer 7, which will be described hereinafter.

In the magnetic pole teeth 33 through 38, the rotor-opposing surfaces 33d through 38d at the distal ends thereof are arranged on an arc having a radius R1 such that they are equidistant with respect to the point coinciding with the rotation center 21 of the rotor 2, as shown in FIGS. 1, 3, 4, and 5. Pitches R1 of the rotor-opposing surfaces 33d through 38d in the circumferential direction are all set to be equal. Specifically, each of the pitches R1 of the rotor-opposing surfaces 33d to 38d indicates the interval between circumferential center positions 33g to 38g of the adjoining rotor-opposing surfaces 33d through 38d in terms of the angle at the rotation center 21. The pitch R1 of the rotor-opposing surfaces 33d through 38d is set to, for example, 15 degrees.

In this case, a value Q denoting the interval between the circumferential center positions of the rotor-opposing surfaces 33d and 38d, which are located at both ends, in terms of angle with respect to the rotation center 21 will be set to a central angle of 75 degrees with respect to the point that coincides with the rotation center 21 of the rotor 2.

In the yoke 32, the side thereof to which the magnetic pole teeth 33 through 38 are connected, namely, a surface 32a opposing the rotor 2, is set to be arcuate as observed from above. Referring to FIG. 4, the surface 32a is set on an arc of a radius R2 having, as its center, a point 39 set at a position away from the stator 3 farther than the point coinciding with the rotation center 21 of the rotor 2. At the same time, proximal centers 33f and 38f of the magnetic pole teeth 33 and 38, respectively, that are connected to the surface 32a are set at the positions equidistant from the rotation center 21. Similarly, the proximal centers 34f and 37f of the magnetic pole teeth 34 and 37, respectively, are set at the positions equidistant from the rotation center 21, and the proximal centers 35f and 36f of the magnetic pole teeth 35 and 36, respectively, are set at the positions equidistant from the rotation center 21. In other words, the shape of the stator core 31 is set to be line-symmetrical with respect to a straight line L1 passing the rotation center 21 and the point 39.

Furthermore, in the magnetic pole teeth 33 through 38, pitches P2 of the proximal centers 33f through 38f thereof are set to be equal, as shown in FIG. 4. In other words, the pitch P2 of the proximal centers 33f through 38f denotes the interval between the circumferential centers along the surface 32a at the proximal ends of the adjoining magnetic pole teeth 33 through 38 in terms of angles at the point 39. The pitch P2 of the proximal centers 33f through 38f is set at a value, e.g., 7 degrees, that is smaller than the value of the pitch P1 of the rotor-opposing surfaces 33d through 38d.

In this case, the pitch P2 of the proximal centers 33f through 38f is set such that at least one value of the angles formed by adjoining magnetic pole teeth 33 through 38 in the extending direction is smaller than the angle formed by straight lines connecting the rotor-opposing surfaces 33d through 38d of the adjoining magnetic pole teeth 33 through 38 with the rotation center 21 of the rotor 2. This means that, in the magnetic pole teeth 33 through 38, at least one value (P2) of the angles at the point 39, at which the straight lines connecting the proximal centers 33f through 38f with the circumferential center positions 33g through 38g, respectively, of the rotor-opposing surfaces 33d through 38d intersect with each other when they are extended, is set to a value smaller than the angle (P1) formed by the lines connecting the circumferential center positions 33g through 38g of the rotor-opposing surfaces 33d through 38d and the rotation center 21.

The point 39 is set such that it is positioned on the outer side of the rotor 2.

Further, in the magnetic pole teeth 33 through 38, the winding portions 33c through 38c sharing the same width in their extending direction are provided such that they extend on the straight lines that pass the proximal centers 33f through 38f thereof and the point 39, as illustrated in FIG. 4. The drawing shows the relationship between the winding portion 38c in the magnetic pole tooth 38 and the straight line passing the proximal center 38f and the point 39.

Thus, the lengths L33 through L35 and L36 through L38 of the winding portions 33c through 38c in the magnetic pole teeth 33 through 38 are set to be different by setting the pitches R1 and P2. More specifically, as shown in FIGS. 3 and 4, the length L33 of the winding portion 33c is set to be longer than the length L34 of the winding portion 34c, and the length L34 of the winding portion 34c is set to be longer than the length L35 of the winding portion 35c. Furthermore, the length L33 of the winding portion 33c is set to be equal to the length L38 of the winding portion 38c, the length L34 of the winding portion 34c is set to be equal to the length L37 of the winding portion 37c, and the length L35 of the winding portion 35c is set to be equal to the length L36 of the winding portion 36c. The setting can be expressed as shown below:

$$L33=L38>L34=L37>L35=L36$$

In the coils 33a through 38a, the number of turns N33 through N35 and N36 through N38 of the individual windings are set to be different. The number of turns N33 through N38 can be set in proportion to the lengths L33 through L38 of the winding portions 33c through 38c. For example, the number of turns N33 is set to be larger than the number of turns N34, and the number of turns N34 is set to be larger than the number of turns N35. Furthermore, the number of turns N33 and the number of turns N38 are set to be equal, the number of turns N34 and the number of turns N37 are set to be equal, and the number of turns N35 and the number of turns N36 are set to be equal. The setting can be expressed as shown below:

$$N33=N38 \geq N34=N37 \geq N35=N36$$

Furthermore, the coils 33a through 38a are connected in three phases (U phase, V phase, and W phase) to be compatible with the rotor 2 having sixteen poles. The coil 33a is set for the U phase, the coil 34a is set for the W phase, the coil 35a is set for the V phase, the coil 36a is set for the U phase, the coil 37a is set for the W phase, and the coil 38a is set for the V phase.

Thus, a sum Nu of the number of turns for the U phase is set to N33+N36, a sum Nv of the number of turns for the V phase is set to N35+N38, and a sum Nw of the number of turns for the W phase is set to N34+N37. These sums are set to be equal, which is expressed as shown below:

$$Nu=Nw=Nv$$

Thus, the torque applied to the rotor 2 in the three phases (the U phase, the V phase, and the W phase) can be set to be equal.

With the arrangement described above, at one side of the rotor 2, that is, in the plane parallel to the rotative plane of the rotor 2, the stator 3 may have the central angle Q with respect to the point coinciding with the rotation center 21 of the rotor 2 set at 180 degrees or less, or further at 90 degrees or less.

Thus, setting the stator 3 to have the central angle of 180 degrees or less provides an advantage in that the area of the stator core, as observed from above, can be reduced to about half or less, as compared with a case where the stator is provided around the full circumference of the rotor 2. It is further preferable to set the stator 3 to have the central angle of 90 degrees or less because the area of the stator core can be further reduced.

FIG. 5 is a schematic plan view illustrating the relationship between the magnet 25 and the magnetic pole teeth 33 through 38 shown in FIG. 1.

Referring to FIG. 5, the stator 3 and the rotor 2 are positioned such that the rotor-opposing surfaces 33d through 38d face the rotor 2. The relationship between the magnetic pole teeth 33 through 38 and the magnet 25 will be described below.

As mentioned above, in the circumferential direction of the rotor 2, the magnetic poles 25n, 25s, and so on are provided at a pitch of 22.5 degrees with respect to the rotation center 21. The pitch is denoted by P3 in FIG. 5. As previously mentioned, the pitch P1 of the rotor-opposing surfaces 33d through 38d in the circumferential direction is set to, for example, 15 degrees. This means that half of, for example, one magnetic pole tooth 33 and the entirety of the magnetic pole tooth 34, i.e., one and a half magnetic pole teeth among the magnetic pole teeth 33 through 38, correspond to each of the magnetic poles 25n, 25s, and so on of the rotor 2. In the drawing, the magnetic pole teeth 37 and 38 are not shown.

Referring to FIG. 5, the magnetic poles in the stator 3 and the rotor 2 are provided such that, when the circumferential center position (distal center) 33g of the rotor-opposing surface 33d of the magnetic pole tooth 33 is at the position where it opposes a boundary position 25a between a magnetic pole 25s0 and a magnetic pole 25n1, the circumferential center position 34g of the rotor-opposing surface 34d of the adjacent magnetic pole tooth 34 is at the position where it opposes a second position 25b from the magnetic pole 25s0 when the pitch P3 of the magnetic pole 25n1 is divided into three sub-pitches in the circumferential direction. Similarly, the circumferential center position 35g of the rotor-opposing surface 35d of the succeeding magnetic pole tooth 35 is at the position where it opposes a first position 25c from the magnetic pole 25n1 when the pitch P3 of the magnetic pole 25s1 is divided into three sub-pitches in the circumferential direction. Furthermore, the circumferential center position 36g of the rotor-opposing surface 36d of the magnetic pole tooth 36 is at the position where it opposes a boundary position 25d between the succeeding magnetic pole 25s1 and another magnetic pole 25n2.

The shapes of the stator 3 and the rotor 2 in the three-phase motor will now be described.

Figure 7:
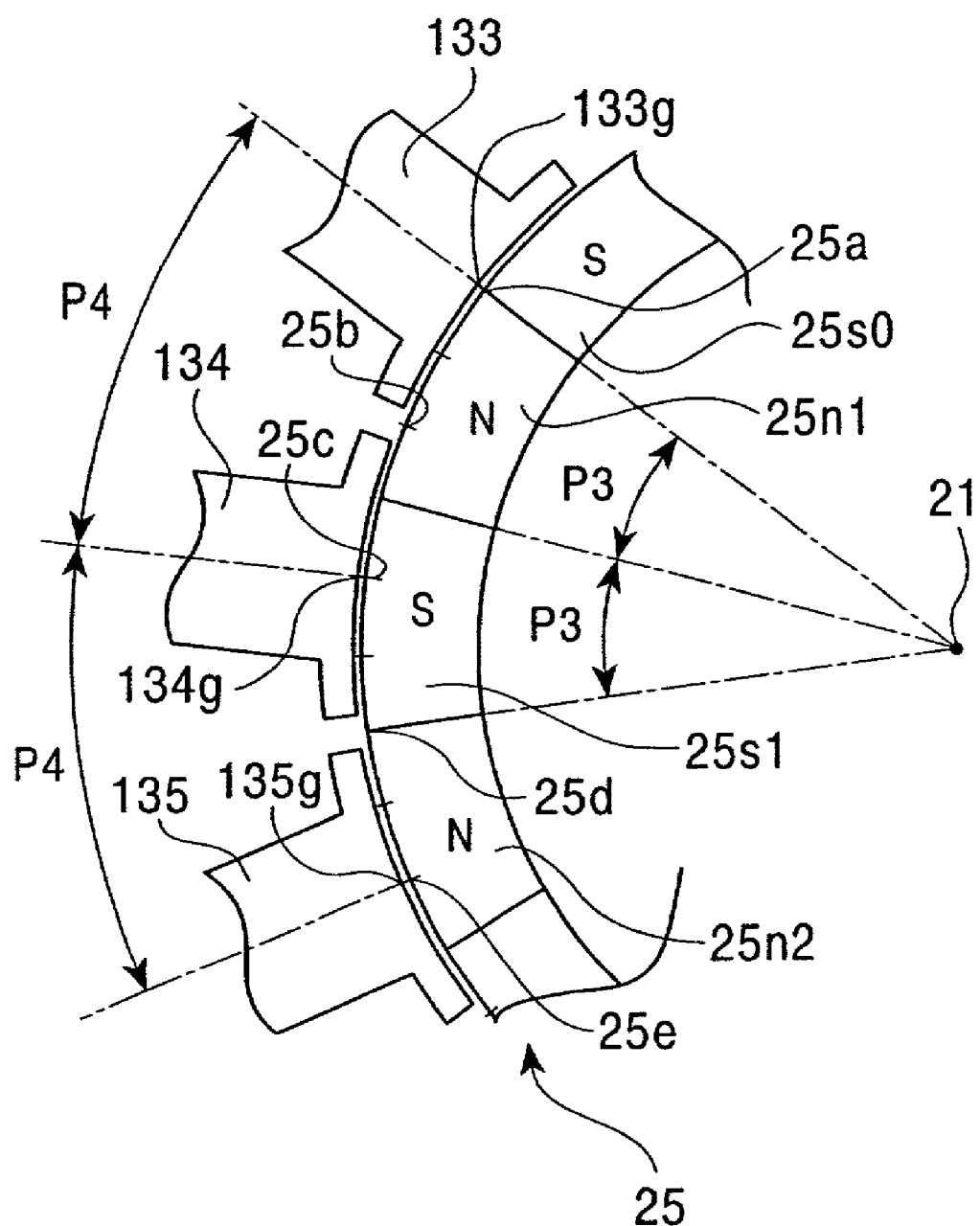
FIG. 7 is a schematic plan view illustrating the relationship between the magnet 25 and magnetic pole teeth 133 through 136 in a conventional motor.

FIG. 7 is a schematic plan view illustrating the relationship between a magnet 25 and magnetic pole teeth 133 through 136 of a conventional motor. For the sake of clarity, only three magnetic pole teeth are shown, and the rest has been omitted, and the structure of the magnet is the same as that of the embodiment shown in FIG. 5. Hence, like components will be assigned like reference numerals, and the descriptions thereof will not be repeated.

In the conventional three-phase inner rotor motor shown in FIG. 7, the U phase, the V phase, and the W phase are respectively set such that the magnetic pole teeth 133, 134, and 135 have a phase difference equivalent to a 120-degree electrical angle when a 360-degree electrical angle is set for a pair of magnetic poles 25n and 25s of the rotor.

To be more specific, as described in conjunction with FIG. 5, in relation to the magnet 25, when the circumferential center position 133g of the rotor-opposing surface of the magnetic pole tooth 133 is at the position where it opposes a boundary position 25a between a magnetic pole 25s0 and a magnetic pole 25n1, the circumferential center position 134g of the rotor-opposing surface of a magnetic pole tooth 134 is at the position where it opposes a first position 25c from the magnetic pole 25n1 when a pitch P3 of a magnetic pole 25s1 is divided into three sub-pitches in the circumferential direction. Similarly, the circumferential center position 135g of the rotor-opposing surface of a magnetic pole tooth 135 is at the position where it opposes a second position 25d from the magnetic pole 25s1 when the pitch P3 of the magnetic pole 25n2 is divided into three sub-pitches in the circumferential direction.

Thus, in the conventional three-phase inner rotor motor shown in FIG. 7, the three magnetic pole teeth 133, 134, and 135 are disposed at a pitch P4 of, for example, 30 degrees, with respect to the rotation center 21. This means that providing the magnetic pole teeth at the same pitch P4 around the full circumference of the rotor 2 will make a twelve-pole stator.

The conventional three-phase inner rotor motor shown in FIG. 7 has a U-phase coil to which a first drive current is supplied, a V-phase coil to which a second drive current having a phase that is 120 degrees ahead of the phase of the first drive current is supplied, and a W-phase coil to which a third drive current having a phase that is 120 degrees ahead of the phase of the second drive current is supplied. These coils are disposed in the order of the U phase, the V phase, and the W phase.

In comparison with the above conventional inner rotor motor, the inner rotor motor in accordance with the embodiment has its magnetic pole teeth 133, 134, and 135 disposed such that the U phase, the V phase, and the W phase are set to have the phase difference of the 120-degree electric angle. The coil 33a is set for the U phase, the coil 34a is set for the W phase, and the coil 35a is set for the V phase, the coil 36a is set for the U phase, the coil 37a is set for the W phase, and the coil 38a is set for the V phase.

Thus, the U-phase coil to which a first drive current is supplied, the V-phase coil to which a second drive current having a phase that is 120 degrees ahead of the phase of the first drive current is supplied, and the W-phase coil to which a third drive current having a phase that is 120 degrees ahead of the phase of the second drive current is supplied are disposed in the order of the U phase, the W phase, and the V phase. In the embodiment, the pitch P1 of the rotor-opposing surfaces 33d through 38d in the magnetic pole teeth 33 through 38 is set to, for example, 15 degrees. Hence, in the embodiment, providing the magnetic pole teeth around the full circumference of the rotor 2 at the pitch P1 will make a 24-pole stator.

Accordingly, in this embodiment, the number of the magnetic pole teeth disposed per a unit angle at the center angle with respect to the rotation center 21 is set to be larger than the number of the magnetic poles of the rotor 2. In other words, in this embodiment, the angle density of the magnetic pole teeth 33 through 38 with respect to the center angle at the rotation center 21 is set to be higher than the angle density of the magnetic poles 25n and 25s of the rotor 2. Conversely, in the conventional three-phase inner rotor motor shown in FIG. 7, the number of the magnetic pole teeth disposed per unit angle at the center angle with respect to the rotation center 21 is set to be smaller than the number of magnetic poles of the rotor. Specifically, in the conventional three-phase inner rotor motor shown in FIG. 7, the angle density of the magnetic pole teeth 133 through 138 with respect to the center angle at the rotation center is set to be smaller than the angle density of the magnetic poles 25n and 25s of the rotor.

Thus, providing the conventional three-phase inner rotor motor shown in FIG. 7 with, for example, six magnetic pole teeth, will require 120 degrees in terms of the center angle at the rotation center 21 of the rotor 2, thus requiring a larger area for the stator accordingly.

Furthermore, providing the magnetic pole teeth 133, 134, and 135 on the straight line passing the rotation center 21 and the circumferential center positions 133g, 134g, 135g, and so on of the rotor-opposing surfaces would require a greater circumferential length of the yoke, as compared with a case where they are provided on the straight line passing the point 39 set at a position farther away from the stator 3 than the rotation center 21 as in this embodiment. Therefore, the area of the yoke as observed from above would not be reduced, making it impossible to adequately reduce the area of the stator core 31.

At the position opposing the stator 3 with the rotor 2 sandwiched therebetween, the magnetic balancers 7 for securing magnetic balance between the rotor 2 and the stator 3 are provided.

As shown in FIGS. 1 and 2, the magnetic balancer 7 is made integral with the bottom surface of the chassis 1, being in contact with the notch 12 provided in the chassis 1 at under the rotational position of the rotor 2, and raised upright from the bottom surface of the chassis 1. A plurality of the magnetic balancers 7 are provided around the rotational position of the rotor 2 such that they oppose the circumferential surface of the magnet 25 of the rotor 2.

The magnetic balancer 7 is formed of six magnetic balancer segments 71 through 76 in correspondence with the rotor-opposing surfaces 33d through 38d of the stator 3. These segments are arranged such that their associated rotor-opposing surfaces 71a through 76a are point-symmetrical to the rotor-opposing surfaces 33d through 38d of the magnetic pole teeth 33 through 38 with respect to the rotation center 21 of the rotor.

More specifically, in the magnetic balancer segment 71, the rotor-opposing surface 71a is disposed to be symmetrical to the rotor-opposing surface 33d with respect to the rotation center 21. In the magnetic balancer segment 72, the rotor-opposing surface 72a is disposed to be symmetrical to the rotor-opposing surface 34d with respect to the rotation center 21. Similarly, the rotor-opposing surface 73a and the rotor-opposing surface 35d, the rotor-opposing surface 74a and the rotor-opposing surface 36d, the rotor-opposing surface 75a and the rotor-opposing surface 37d, and the rotor-opposing surface 76a and the rotor-opposing surface 38d are provided such that they are symmetrical to each other with respect to the rotation center 21.

This is to balance the magnetic influences exerted from the stator 3 toward the rotor 2 by the shape of the magnetic balancer 7 thereby to maintain the magnetic influences on the rotor 2 to be symmetrically balanced with respect to the rotation center 21.

To be more specific, the rotor-opposing surfaces 71a through 76a are set on the arc of a radius R1' such that they are equidistant from the point 21 that coincides with the rotation center of the rotor 2. The radius R1' is set to be larger than a radius R1 set for the rotor-opposing surfaces 33d through 38d, considering the height of the magnetic balancers 7, which will be discussed hereinafter. As in the case of the pitch R1 of the rotor-opposing surfaces 33d through 38d, the pitches for the rotor-opposing surfaces 71a through 76a are all set to the same value, e.g., 15 degrees.

The circumferential lengths of the rotor-opposing surfaces 71a through 76a are set to correspond to the lengths of the rotor-opposing surfaces 33d through 38d of the magnetic pole teeth 33 through 38 with respect to the rotation center 21 of the rotor.

More specifically, in the magnetic balancer segment 71, the circumferential length of the rotor-opposing surface 71a is set to be equal to the circumferential length of the rotor-opposing surface 33d. In the magnetic balancer segment 72, the circumferential length of the rotor-opposing surface 72a is set to be equal to the circumferential length of the rotor-opposing surface 34d. Similarly, in the magnetic balancer segment 73, the circumferential length of the rotor-opposing surface 73a is set to be equal to the circumferential length of the rotor-opposing surface 35d; in the magnetic balancer segment 74, the circumferential length of the rotor-opposing surface 74a is set to be equal to the circumferential length of the rotor-opposing surface 36d; in the magnetic balancer segment 75, the circumferential length of the rotor-opposing surface 75a is set to be equal to the circumferential length of the rotor-opposing surface 37d; and in the magnetic balancer segment 76, the circumferential length of the rotor-opposing surface 76a is set to be equal to the circumferential length of the rotor-opposing surface 38d.

The magnetic balancer 7 is installed at a position lower than the rotor 2. More specifically, the magnetic balancer 7 is provided such that the central position of the magnetic balancer 7 in the height direction is lower than the central position of the magnet 25 of the rotor 2 in the direction of the rotational axis. Furthermore, the magnetic balancer segments 71 through 76 are set to have substantially the same height, and also set to be lower than an upper surface 26 of the magnet 25 of the rotor 2. Alternatively, upper ends 71b through 76b of the magnetic balancer 7 are set such that they are closer to the bottom surface of the chassis 1 than to the upper surface 26 of the magnet 25 of the rotor 2, as shown in FIG. 2.

The height of the magnetic balancer 7, that is, the difference in height between the upper ends 71b through 76b of the magnetic balancer segments 71 through 76 and the upper surface 26 of the magnet 25, is set so as to set the value of the difference in the central position in the height direction between the distal end portions 33b through 38b and the magnet 25, and also to set the downward (toward the chassis 1) thrusting load for maintaining the rotational stability of the rotor 2.

The descriptions will now be given of how the shape of the magnetic balancer 7 is set.

Referring to FIG. 2B, a force F3 acts between the rotor 2 and the stator 3, and a force F7 also acts between the rotor 2 and the magnetic balancer 7 at the same time. The force F3 acts away from the rotative plane of the rotor 2 toward the bottom surface of the chassis 1. This is because the force F3 acts toward the distal end portions 33b through 38b provided at a level lower than the magnet 25 of the rotor 2. Similarly, the force F7 acts away from the rotative plane of the rotor 2 toward the bottom surface of the chassis 1. This is because the force F7 acts toward the magnetic balancer 7 provided at a level lower than the magnet 25 of the rotor 2.

In this case, the forces F3 and F7 cause the rotor 2 to generate torque in relation to the bearings 22. For the rotor 2 to stably rotate without inclining, the forces F3 and F7 must satisfy expression (1) shown below:

$$F7t \cdot (RA-RB) < F3t \cdot (RA+RB)$$

$$F3t \cdot (RA-RB) < F7t \cdot (RA+RB) \quad (1)$$

where $F3t = F3 \cos\theta_1$ (Perpendicular component of F3)
$F7t = F7 \cos\theta_2$ (Perpendicular component of F7)
RA: Radius of the outer peripheral surface of the magnet 25 with respect to the rotation center 21
RB: Rotative radius of the bearing 22 with respect to the rotation center 21

Thus, it is possible for the forces F3 and F7 to impart a thrusting force for stabilizing the rotation of the rotor 2 to the rotor 2 in the direction of the rotary axis of the rotor 2 by combining the force F3t and the force F7t. In other words, the peripheral edge of the rotor 2 is pressed against the bottom surface of the chassis 1.

At this time, the magnetic fluxes from the magnet 25 enter into the bottom surface of the chassis 1 through the gap between the notch 11 and the notch 14, the gap between the notch 14 and the notch 12, the gap between the notch 12 and the notch 13, and the gap between the notch 13 and the notch 11. This causes a downward thrusting force to be applied to the rotor 2.

Thus, the force F3 and the force F7 are set so as to set the downward force applied to the rotor 2 in order to stabilize the rotation of the rotor 2 and to restrain deterioration of the drive performance due to influences, such as friction, caused by an increase in the thrusting force in the rotary axis of the rotor 2.

Furthermore, the forces F3 and F7 are set such that a force F7p is larger than a force F3p in the direction perpendicular to the rotary axis of the rotor 2, that is, in the direction parallel to the bottom of the chassis 1. To be more specific, the setting is made such that the leftward force F3p is smaller than the rightward force F7p, as shown in FIG. 2B. Thus, the rotary axis of the rotor 2 is stabilized by imparting the rightward force F2 shown in FIG. 2B, i.e., the force directed from the stator 3 to the magnetic balancer 7, to the rotary axis 21 of the rotor 2.

The parameters for setting the force F3 and the force F7 as described above include the following:

The areas of the rotor-opposing surfaces 33d through 38d;

The distances between the rotor-opposing surfaces 33d through 38d and the outer peripheral surface of the magnet 25;

The positional relationship in the height direction between the rotor-opposing surfaces 33d through 38d and the magnet 25;

The areas of the rotor-opposing surfaces 71a through 76a;

The distances between the rotor-opposing surfaces 71a through 76a and the outer peripheral surface of the magnet 25; and The positional relationship in the height direction between the rotor-opposing surfaces 71a through 76a and the magnet 25.

The above parameters are combined to obtain optimum settings.

The magnetic head assembly 4 is formed of a first head 41 and a second head 42 vertically provided, opposing each other, to read/write magnetic signals from/to a disk. These heads are attached to a head carriage 43. The positions of the first head 41 and the second head 42 are controlled by a position controller 5.

The position controller 5 is provided, as shown in FIG. 1, with a stepping motor 51 for driving the head carriage 43. The stepping motor 51 is retained at the rear center of the chassis 1, and configured to serve as a driving source for driving the head carriage 43 back and forth. The output shaft of the stepping motor 51 is formed by a lead screw rod 52 that has a spiral V-shaped groove and extends forward and backward, the distal end thereof being supported by a bearing. A guiding bar 53 is provided in parallel to the lead screw rod 52, and the guiding bar 53 is retained at the rear center of the chassis 1 to guide the head carriage 43 backward or forward, which will be discussed later.

The head carriage 43 has a needle pin 54 projecting aslant toward the rear and a leaf spring that presses the needle pin 54 into contact with the V-shaped groove of the lead screw rod 52. The head carriage 43 is attached to the guiding bar 53 such that it is free to move back and forth, and is positioned above the chassis 1. The magnetic head 41 for reading the information recorded on a disk is retained on the distal end of the head carriage 43, and a head arm 55 having the magnetic head 42 associated with the magnetic head 41 is swingably installed on the rear upper end through the intermediary of an elastic member. The head arm 55 is rotatably urged by a torsion spring 56 to cause the magnetic head 42 to be closer to the magnetic head 41. A stopper for restricting the circular movement of the arm is integrally provided on one side edge of the head arm 55, the stopper projecting sideways.

On the board 6, there are provided the position controller 5, chips 61 and 61 acting as a controller for controlling the drive of the inner rotor motor, a capacitor 62, etc.

The magnetic shield 8 for blocking the magnetic fluxes from the magnet 25 to the magnetic heads 41 and 42 is provided at the end of the rotor 2 that is adjacent to the magnetic head assembly 4.

Figure 6:
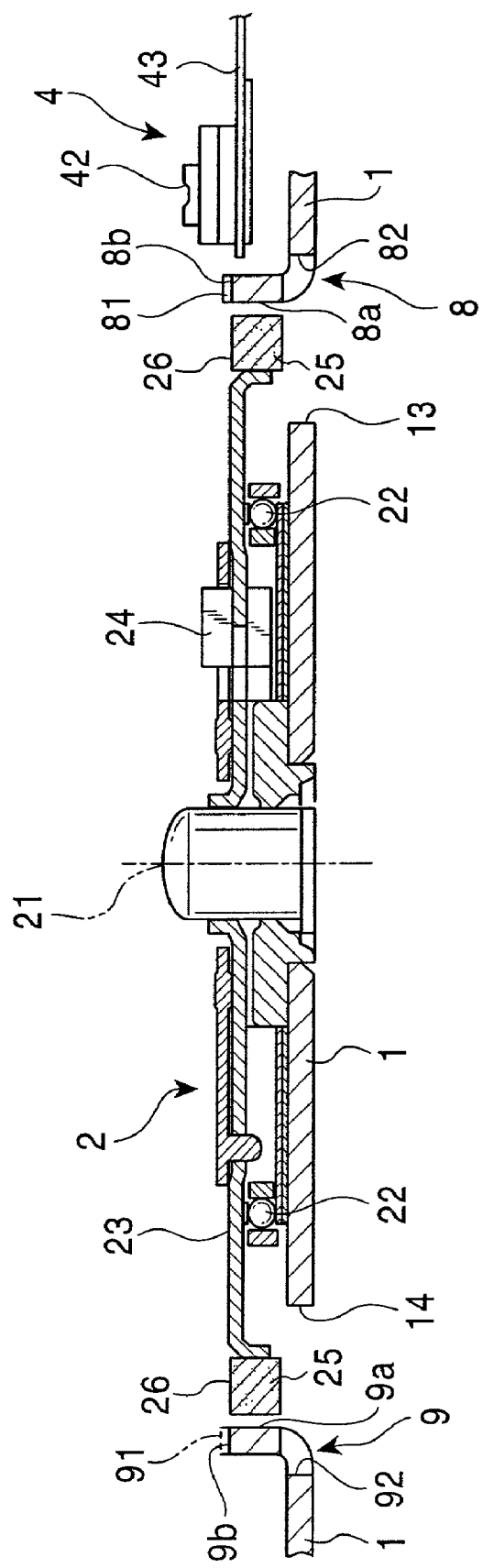
FIG. 6 is a sectional view taken at the line VI—VI, illustrating the magnetic shield of the inner rotor motor in FIG. 1.

FIG. 6 is a fragmentary sectional view of the magnetic shield of the inner rotor motor taken at the line VI—VI shown in FIG. 1.

Referring to FIG. 1 and FIG. 6, the magnetic shield 8 is made integral with the bottom surface of the chassis 1, being in contact with the notch 13 provided in the chassis 1 at under the rotational position of the rotor 2. The magnetic shield 8 is raised upright from the bottom surface of the chassis 1, thus being provided around the rotational position of the rotor 2 such that it opposes the circumferential surface of the magnet 25 of the rotor 2.

The magnetic shield 8 is substantially linearly formed (substantially tangential to the circumference of the rotor 2) as observed from above, and the length thereof is set such that the magnet 25 of the rotor 2 is hidden when the rotor 2 is observed from the magnetic head 42. Specifically, the length of the magnetic shield 8 may be set to block the magnetic fluxes from the magnet 25 so as to prevent the operations of the magnetic heads 41 and 42 from being affected thereby.

The linear magnetic shield 8 is positioned such that it approaches the rotor 2 most closely at the central portion thereof. The distance between a rotor-opposing surface 8a and the magnet 25 is the largest at both ends of the magnetic shield 8, while the distance is the smallest at the central portion thereof.

Thus, even if the length of the magnetic shield 8 is different from the length corresponding to two adjoining magnetic poles 25n and 25s of the magnet 25 shown in FIG. 5, it is possible to prevent a sudden increase or decrease in the magnetic fluxes entering the magnetic shield 8 from the magnet 25 of the rotating rotor 2. This allows the magnetic fluxes to gently change to a maximum value, so that the occurrence of cogging can be restrained. Hence, the detent torque of the rotor can be reduced.

It is conceivable to set the magnetic shield 8 to have substantially the same length as that of the two adjoining magnetic poles 25*n* and 25*s* of the magnet 25 shown in FIG. 5 to obtain an optimum length for preventing the occurrence of cogging. If, however, the length is set to substantially the same length as that of the two adjoining magnetic poles 25*n* and 25*s* of the magnet 25 shown in FIG. 5, then the notch 13 will be inevitably larger to match the length of the magnetic shield 8. This may cause the strength of the shield 1 to reduce.

Therefore, in order to set the length of the magnetic shield 8 to be shorter than the two adjoining magnetic poles 25*n* and 25*s* of the magnet 25, while restraining the cogging and maintaining the strength of the chassis 1 at the same time, it is necessary to make the setting so that the distance between the rotor-opposing surface 8*a* of the magnetic shield 8 and the rotative surface of the rotor 2 gradually increases or decreases. This makes it possible to restrain the cogging without inversely affecting the strength of the chassis 1.

An upper end 8*b* of the magnetic shield 8 is set to be substantially flush with the upper surface 26 of the magnet 25 of the rotor 2, as shown in FIG. 6. The dimension of the rotor-opposing surface 8*a* in the height direction is set to be substantially equal to or larger than the dimension of the magnet 25 in the height direction. This arrangement makes it possible to block the magnetic fluxes from the magnet 25 so as to restrain the magnetic fluxes from the magnet 25 from adversely affecting the operation of the magnet head 42. The magnetic shield 8 is shaped so as to pull the magnet 25 only in the horizontal direction, thereby reducing the perpendicular load applied to the rotor 2.

In other words, the perpendicular load applied to the rotor 2 can be set by setting the shape of the magnetic shield 8.

At the position opposing the magnetic shield 8 with the rotor 2 sandwiched therebetween, the magnetic balancer 9 for securing magnetic balance between the rotor 2 and the magnetic shield 8 is provided.

Referring to FIG. 1 and FIG. 6, the magnetic balancer 9 is made integral with the bottom surface of the chassis 1, being in contact with the notch 14 provided in the chassis 1 at under the rotational position of the rotor 2. The magnetic balancer 9 is raised upright from the bottom surface of the chassis 1, thus being provided around the rotational position of the rotor 2 such that it opposes the circumferential surface of the magnet 25 of the rotor 2.

The magnetic balancer 9 is constructed to correspond to the magnetic shield 8, and disposed such that it is point-symmetrical to the magnetic shield 8 with respect to the rotation center 21 of the rotor.

More specifically, the linear magnetic balancer 9 is set to have the same length as the magnetic shield 8, and the position thereof in relation to the magnet 25 of the rotor 2 is similar to that of the magnetic shield 8, wherein the magnetic balancer 9 approaches the rotor 2 most closely at its central portion. The distance between a rotor-opposing surface 9a and the magnet 25 is the largest at both ends of the magnetic balancer 9, while the smallest at the central portion thereof.

Referring to FIG. 6, an upper end 9*b* of the magnetic balancer 9 is set to be flush with the upper surface 26 of the magnet 25 of the rotor 2. As in the case of the rotor-opposing surface 8*a* of the magnetic shield 8, the dimension of the rotor-opposing surface 9*a* in the height direction is set to be equal to or larger than the dimension of the magnet 25 in the height direction.

Furthermore, the chassis 1 serving as the base of the magnetic shield 8 and the magnetic balancer 9 is provided with through holes 82 and 92 for reducing the stress that affects the bottom surface of the chassis 1 when forming the magnetic shield 8, the magnetic balancer 9, and the chassis 1 by press-bending. The through holes 82 and 92 may not be provided.

Thus, the magnetic balancer 9 is shaped to be point-symmetrical to the magnetic shield 8 with respect to the rotation center 21 of the rotor 2 thereby to balance the magnetic influences from the magnetic shield 8 on the rotor 2. With this arrangement, the magnetic balance in relation to the rotor 2 is maintained to be symmetrical with respect to the rotation center 21.

The magnetic balancer 7, the magnetic shield 8, and the magnetic balancer 9 are provided with convex cartridge supports 77, 81, and 91 that project above the upper surface 26 of the magnet 25 of the rotor 2 and are mounted on upper ends 74*b*, 8*b*, and 9*b*, as shown in FIG. 1, FIG. 2, and FIG. 6. The cartridge supports 77, 81, and 91 are provided to support a disk cartridge of a floppy disk or the like such that the disk cartridge will not come in contact with any rotating portion of the rotor 2 even if the disk cartridge develops thermal deformation or the like. For this reason, the upper ends of the cartridge supports 77, 81, and 91 are set at a height that will not interfere with the disk rotation by the rotor 2 and will not cause the cartridge to interfere with the rotation of the rotor.

Thus, in the inner rotor motor and the disk unit according to the embodiment, the stator 3 is provided at one end of the rotor 2, that is, in the plane parallel to the rotary plane of the rotor 2, to an extent wherein the central angle Q with respect to the point 21 coinciding with the rotation center of the rotor 2 is set at 180 degrees or less, or further preferably at 90 degrees or less. With this arrangement, the area of the stator core can be reduced to about half or less, as compared with the structure where the stator is provided around the full circumference of the rotor, as in the case of a conventional inner rotor motor. This makes it possible to reduce the cost required for a stator core formed of, for example, a silicon steel plate, or the cost for the coil windings or the like can be reduced so as to cut down the manufacturing cost of the inner rotor motor.

At the same time, as compared with the case where the stator is provided around the full circumference of the rotor, the area required for mounting a motor can be reduced, thus permitting a reduced size. Moreover, the number of magnetic pole teeth can be reduced, so that a reduction in weight can be achieved.

In the disk apparatus according to the embodiment, the area required for mounting a motor can be reduced, so that a reduction in size is possible. In addition, the number of magnetic pole teeth can be reduced, permitting a reduction in weight to be achieved.

In the inner rotor motor and the disk unit according to the embodiment, the magnetic balancer 7 for securing magnetic balance between the rotor 2 and the stator 3 is provided on the outer side of the circumference of the rotor 2. Therefore, even if the stator 3 is disposed only on one side of the rotor 2 and the rotor 2 is driven only from the one side thereof, the force acting on the rotor 2 can be symmetrized in good balance with respect to the rotary axis of the rotor 2. Thus, the stability of the rotative drive of the rotor 2 can be adequately maintained.

The magnetic balancer 7 in the embodiment is made integral with the bottom surface of the chassis 1, being in contact with the notch 12 provided in the chassis 1 at under the rotational position of the rotor 2, and raised upright from the bottom surface of the chassis 1. Hence, when a chassis 1 made of, for example, a galvanized steel plate is manufactured, the magnetic balancer 7 and the chassis 1 can be formed at the same time by bending and raising the portion of the notch 12 at the bottom of the rotor 2 toward the side, where the rotor 2 is mounted, by press-cutting. With this arrangement, the manufacturing process can be simplified and the material cost can be saved, permitting reduced manufacturing cost, as compared with the case where a separate member is installed as the magnetic balancer 7.

The magnetic balancer 7 according to the embodiment is formed of a plurality of magnetic balancer segments 71 through 76 arranged in the circumferential direction of the rotor 2. Hence, as set forth above, when the rotor-opposing surfaces 71a through 76a are formed into arcuate surfaces to match the outer peripheral surface of the rotor 2 in the process wherein the chassis 1 made of, for example, the galvanized steel plate is bent and raised, the influences on the bottom surface of the chassis 1 to which the rotor is installed can be restrained. It is therefore possible to control deformation or the like and to achieve greater ease of machining. Moreover, when the magnetic balance is set in relation to the magnetic pole teeth 33 through 38 arranged in the circumferential direction of the rotor 2 with spaces provided therebetween, the magnetic symmetry of the magnetic balancer segments 71 through 76 in relation to the magnetic pole teeth 33 through 38 can be easily accomplished.

In the magnetic balancer 7 according to the embodiment, the arrangement of the magnetic balancer segments 71 through 76 and the arrangement of the rotor-opposing surfaces 33d through 38d of the magnetic pole teeth 33 through 38 are set to be symmetrical with respect to the rotation center 21 of the rotor 2. In addition, the sum of the lengths of the rotor-opposing surfaces 71a through 76a occupying on the outer periphery of the magnet 25 is set to be equal to the sum of the lengths of the rotor-opposing surfaces 33d through 38d of the magnetic pole teeth 33 through 38 that occupy the outer periphery of the magnet 25. With this arrangement, the action applied to the rotor 2 by the magnetic balancer 7 and the stator 3 can be set to be symmetrical with respect to the rotation center 21 of the rotor 2 with greater ease.

In the magnetic balancer segment 71 of the magnetic balancer 7, the rotor-opposing surface 71a is provided at the position where it is symmetrical to the rotor-opposing surface 33d with respect to the rotation center 21, and the circumferential length of the rotor-opposing surface 71a is set to be equal to the circumferential length of the rotor-opposing surface 33d. In the magnetic balancer segment 72, the rotor-opposing surface 72a is provided at the position where it is symmetrical to the rotor-opposing surface 34d with respect to the rotation center 21, and the circumferential length of the rotor-opposing surface 72a is set to be equal to the circumferential length of the rotor-opposing surface 34d. Similarly, in the magnetic balancer segment 73, the rotor-opposing surface 73a is provided at the position where it is symmetrical to the rotor-opposing surface 35d with respect to the rotation center 21, and the circumferential length of the rotor-opposing surface 73a is set to be equal to the circumferential length of the rotor-opposing surface 35d. In magnetic balancer segment 74, the rotor-opposing surface 74a is provided at the position where it is symmetrical to the rotor-opposing surface 36d with respect to the rotation center 21, and the circumferential length of the rotor-opposing surface 74a is set to be equal to the circumferential length of the rotor-opposing surface 36d. In the magnetic balancer segment 75, the rotor-opposing surface 75a is provided at the position where it is symmetrical to the rotor-opposing surface 37d with respect to the rotation center 21, and the circumferential length of the rotor-opposing surface 75a is set to be equal to the circumferential length of the rotor-opposing surface 37d. In the magnetic balancer segment 76, the rotor-opposing surface 76a is provided at the position where it is symmetrical to the rotor-opposing surface 38d with respect to the rotation center 21, and the circumferential length of the rotor-opposing surface 76a is set to be equal to the circumferential length of the rotor-opposing surface 38d. Hence, in designing a magnetic circuit, the action applied to the rotor 2 by the magnetic balancer 7 and the magnetic pole teeth 33 through 38 can be symmetrically set with greater ease.

In this embodiment, the magnetic balancer 7, the magnetic shield 8, and the magnetic balancer 9 are provided as separate structures. Alternatively, however, a magnetic balancer 80 serving also as a magnetic shield, and a magnetic balancer 90 serving also as a magnetic balancer for the magnetic shield may be used, as shown in FIG. 8.

Figure 8:
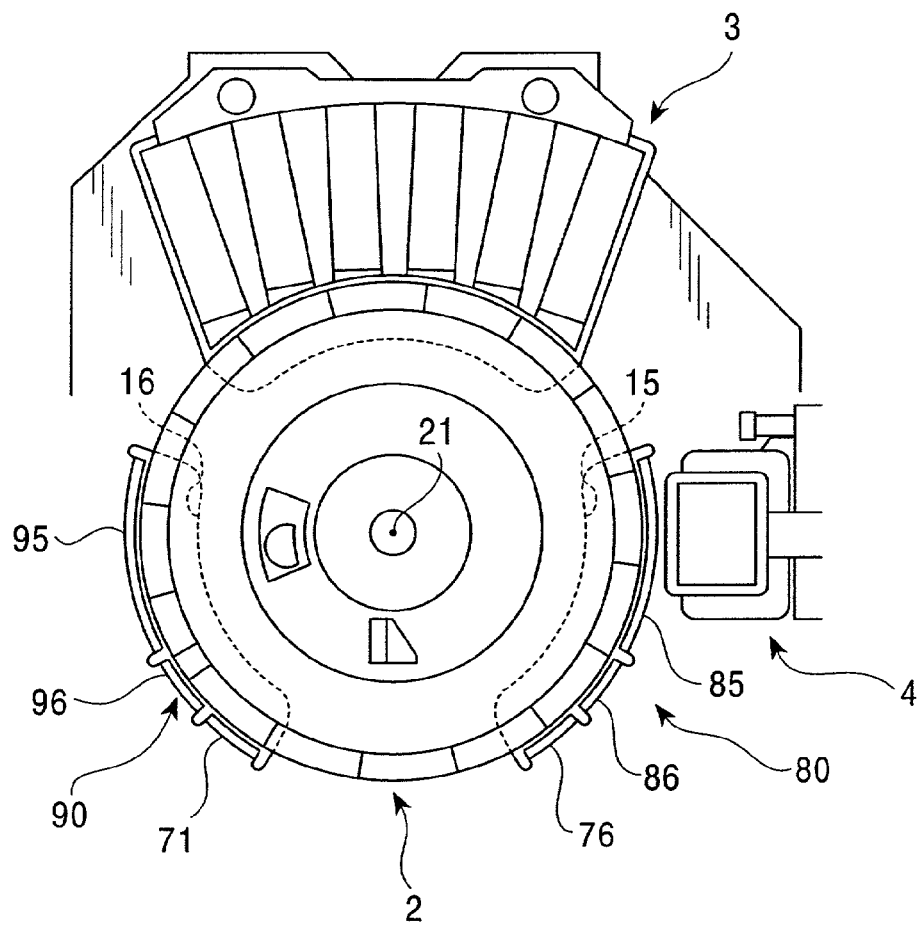
FIG. 8 is a plan view showing a magnetic shield and a magnetic balancer according to another embodiment of the present invention.

Referring to FIG. 8, the magnetic balancer 80 is made integral with the bottom surface of the chassis 1, being in contact with a notch 15 provided in the chassis 1 at under the rotational position of the rotor 2, and raised upright from the bottom surface of the chassis 1. Thus, the magnetic balancer 80 is provided around the rotational position of the rotor 2 such that it opposes the circumferential surface of the magnet 25 of the rotor 2.

The magnetic balancer 80 is formed of a plurality of segments, namely, a magnetic shield segment 85 provided in correspondence with the magnetic head assembly 4, and magnetic balancer segments 86 and 76 provided adjacently thereto.

The circumferential length of the magnetic shield segment 85 is set to be equal to the length of the two adjoining magnetic poles 25n and 25s of the magnet 25, thus restraining the occurrence of cogging.

The magnetic balancer 90 for securing magnetic balance between the rotor 2 and the magnetic balancer 80 is provided at the position opposing the magnetic balancer 80 with the rotor 2 sandwiched therebetween.

Referring to FIG. 8, the magnetic balancer 90 is made integral with the bottom surface of the chassis 1, being in contact with a notch 16 provided in the chassis 1 at under the rotational position of the rotor 2, and raised upright from the bottom surface of the chassis 1. Thus, the magnetic balancer 90 is provided around the rotational position of the rotor 2 such that it opposes the circumferential surface of the magnet 25 of the rotor 2.

The magnetic balancer 90 is constructed in correspondence with the magnetic balancer 80, and has a magnetic balancer segment 95 that is point-symmetrical to the magnetic shield 85 with respect to the rotation center 21 of the rotor.

In other words, the length of the magnetic balancer segment 95 is set to be equal to the length of the magnetic shield 85, and the positional relationship thereof with the magnet 25 of the rotor 2 is also set to be the same as that of the magnetic shield 85.

These magnetic shields 80 and 90 are disposed such that the combined magnetic influences thereof bring about the magnetic balance between the rotor 2 and the stator 3.

The interval between the notch 15 and the notch 16 is larger than the interval between the notch 12 and the notch 13 or between the notch 12 and the notch 14 shown in FIG. 1. Therefore, the downward thrusting force acting on the rotor 2 is increased when the magnetic fluxes from the magnet 25 enter the bottom surface of the chassis 1, and the upper ends of the magnetic shields 80 and 90 will be set at the positions higher than the upper end of the magnetic shield 7.

Figure 9:
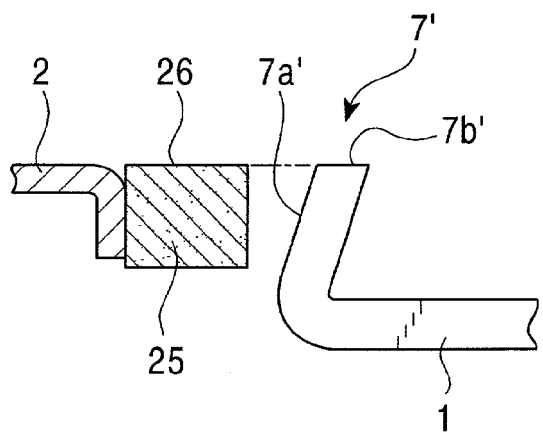
FIG. 9 is a sectional view showing a magnetic balancer according to another embodiment of the present invention.
Figure 10:
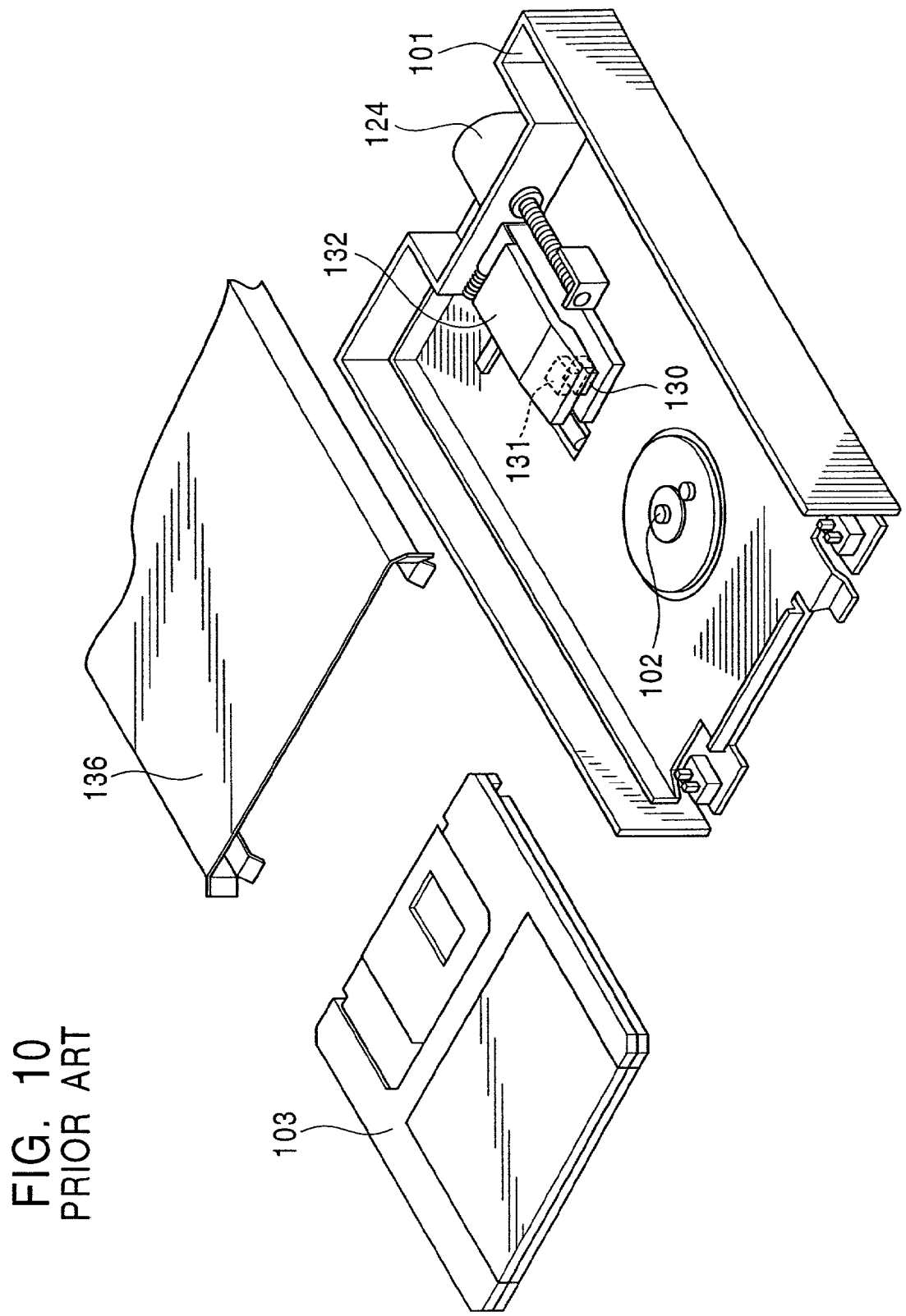
FIG. 10 is a schematic perspective view showing a conventional disk unit.
Figure 11A:
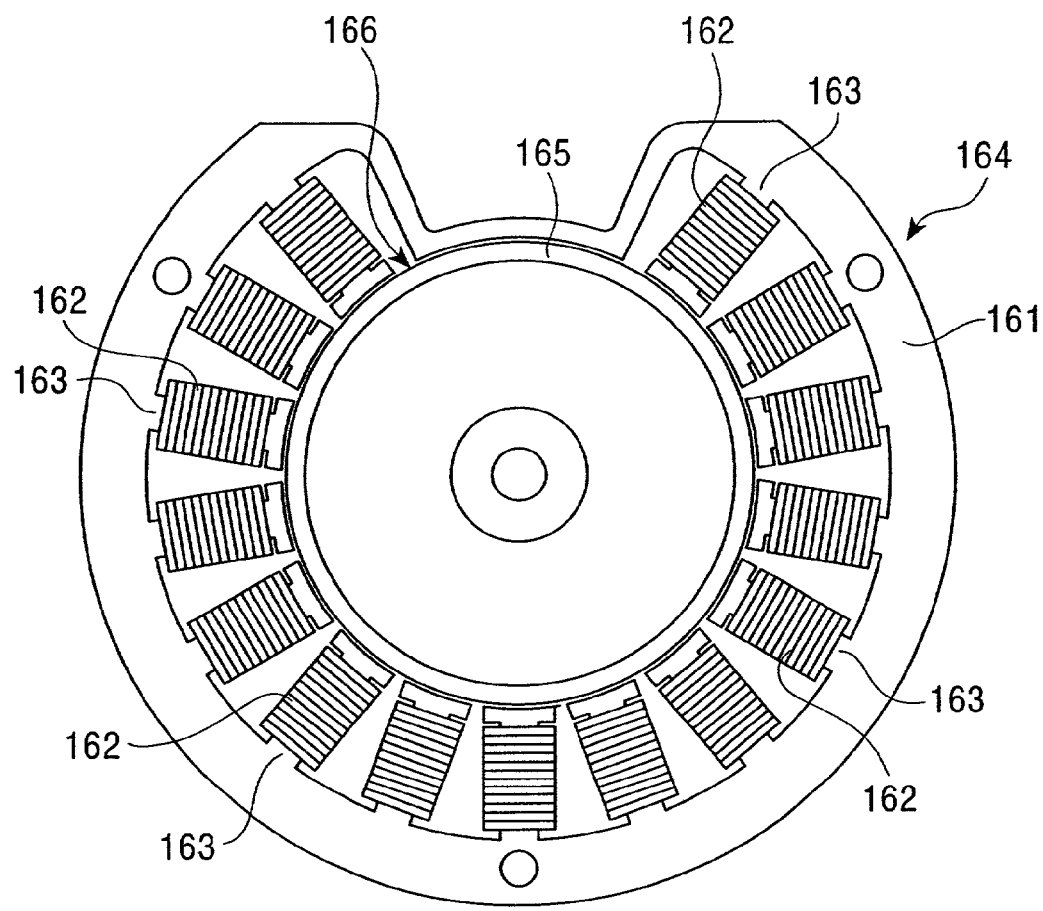
FIG. 11A is a plan view showing a conventional inner rotor motor.
Figure 11B:
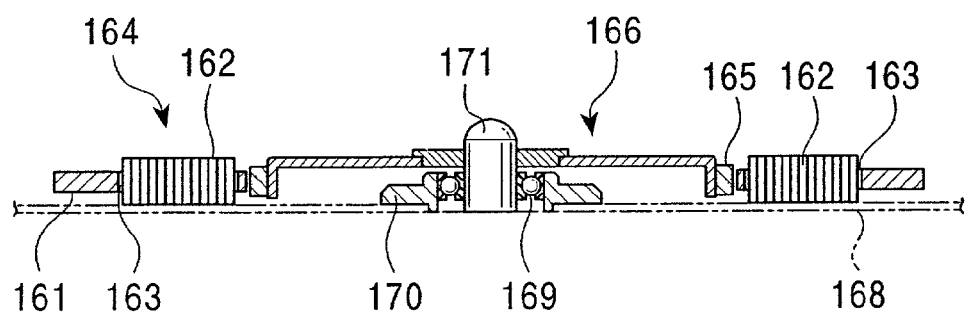
FIG. 11B is a sectional view thereof.

A structure can be implemented, that is similar to the structure wherein the diagonally downward force represented by the force F7 shown in FIG. 2B is applied between the rotor 2 and the magnetic balancer 7. In the structure, an upper end 7b' of a magnetic balancer 7' is set to be flush with the upper surface 26 of the magnet 25 of the rotor 2, and a rotor-opposing surface 7a' gradually inclines away from the outer periphery of the rotor 2 toward its distal end from its proximal end, as shown in FIG. 9. Specifically, since the distance between the rotor-opposing surface 7a' and the outer periphery of the magnet 25 decreases from the upper end toward the lower end, the diagonally downward force will be applied between the rotor 2 and the magnetic balancer 7'.

What is claimed is:

1. An inner rotor motor comprising:
    a rotor having a plurality of permanent magnetic poles circumferentially arranged; and
    a stator having a stator core that includes a plurality of magnetic pole teeth opposing a circumference of the rotor, a single coil being provided on each of the magnetic pole teeth, the magnetic pole teeth each having a rotor-opposing surface,
    wherein the stator extends not more than 180 degrees with respect to a central angle of the rotor, and an angular pitch of the rotor-opposing surfaces and an angular pitch of the permanent magnet poles, as measured about an axis of symmetry of the rotor, differ from each other.

2. The inner rotor motor according to claim 1, wherein the stator extends not more than 90 degrees with respect to the central angle of the rotor.

3. The inner rotor motor according to claim 1, further comprising a magnetic balancer to secure magnetic balance between the rotor and the stator opposing the circumference of the rotor.

4. The inner rotor motor according to claim 3, further comprising a chassis to which the rotor is rotatably installed and which is formed of a magnetic material, the magnetic balancer integral with the chassis.

5. The inner rotor motor according to claim 3, wherein the magnetic balancer comprises a plurality of segments arranged in a circumferential direction of the rotor.

6. The inner rotor motor according to claim 3, wherein a sum of the magnetic fluxes traversing the magnetic balancer from the rotor and a sum of the magnetic fluxes traversing the magnetic pole teeth of the stator from the rotor are equal.

7. The inner rotor motor according to claim 3, wherein the magnetic balancer and the magnetic pole teeth are point-symmetrical with respect to a center of the rotor.

8. The inner rotor motor according to claim 7, wherein the magnetic balancer and symmetrical magnetic pole teeth respectively occupy equal lengths on the circumference of the rotor.

9. The inner rotor motor according to claim 1, wherein six magnetic pole teeth are provided.

10. A disk apparatus comprising the inner rotor motor according to claim 1.

11. A disk apparatus according to claim 10, wherein the inner rotor motor is a three phase motor.

12. An inner rotor motor comprising:
    a rotor having a plurality of permanent magnetic poles circumferentially arranged; and
    a stator having a stator core that includes a plurality of magnetic pole teeth opposing a circumference of the rotor, a single coil being provided on each of the magnetic pole teeth, the magnetic pole teeth each having a rotor-opposing surface,
    wherein the stator extends not more than 90 degrees with respect to a central angle of the rotor, and an angular pitch of the rotor-opposing surfaces and an angular pitch of the permanent magnet poles, as measured about an axis of symmetry of the rotor, differ from each other.

13. The inner rotor motor according to claim 12, the magnetic pole teeth being accommodated in a notch that extends from a core of the stator to below the rotor.

14. The inner rotor motor according to claim 12, the magnetic pole teeth being symmetric around a center of the stator and magnetic pole teeth on one side of the center of the stator having different lengths.

15. The inner rotor motor according to claim 14, the coils having lengths corresponding to the lengths of the corresponding magnetic pole teeth.

16. The inner rotor motor according to claim 15, the coils each having a number of turns corresponding to the length of the coil.

17. The inner rotor motor according to claim 16, the stator configured to receive a plurality of operating phases, the number of turns of the coils corresponding to each phase being equal.

18. The inner rotor motor according to claim 14, a density of the magnetic pole teeth being greater than a density of the magnetic poles in an angle defined by the stator.

19. The inner rotor motor according to claim 18, the magnetic poles having a circumferential length not less than twice a circumferential length of end portions of the magnetic pole teeth opposing the magnetic poles.

20. The inner rotor motor according to claim 12, further comprising a magnetic balancer opposing the circumference of the rotor to secure magnetic balance between the rotor and the stator.

21. The inner rotor motor according to claim 20, further comprising a chassis to which the rotor is rotatably installed and which is formed of a magnetic material, the magnetic balancer integral with the chassis.

22. The inner rotor motor according to claim 21, further comprising a second notch accommodating the magnetic balancer, the first and second notches being symmetric around a center of the rotor.

23. The inner rotor motor according to claim 22, the magnetic shield having a height no smaller than a height of the magnetic poles.

24. The inner rotor motor according to claim 20 the magnetic balancer comprising a plurality of segments arranged in a circumferential direction of the rotor, the magnetic balancer being point-symmetrical with the magnetic pole teeth with respect to a center of the rotor.

25. The inner rotor motor according to claim 24, wherein a sum of the magnetic fluxes traversing the magnetic balancer from the rotor and a sum of the magnetic fluxes traversing the magnetic pole teeth of the stator from the rotor are equal.

26. The inner rotor motor according to claim 25, each magnetic balancer segment being symmetrical with and having an equal circumferential length as that of one of the magnetic pole teeth.

27. The inner rotor motor according to claim 26, a radius of the magnetic balancer segments from the center of the rotor larger than a radius of end portions of the magnetic pole teeth from the center of the rotor.

28. The inner rotor motor according to claim 27, the magnetic balancer segments having substantially equal heights and more proximate to the chassis than an upper surface of the magnetic poles.

29. The inner rotor motor according to claim 28, the end portions of the magnetic pole teeth more proximate to the chassis than an upper surface of the magnetic poles.

30. The inner rotor motor according to claim 12, further comprising a magnetic head and a magnetic shield to block magnetic flux of the magnetic poles from the magnetic head.

31. The inner rotor motor according to claim 30, further comprising a chassis to which the rotor is rotatably installed and which is formed of a magnetic material, the magnetic shield integral with the chassis and having a height no smaller than a height of the magnetic poles.

32. The inner rotor motor according to claim 30, the magnetic shield being substantially tangential to the circumference of the rotor.

33. The inner rotor motor according to claim 30, the magnetic shield being approximately flush with an upper surface of the magnetic poles and increasing in distance from the magnetic poles with increasing proximity to an end of the magnetic shield.

34. The inner rotor motor according to claim 30, further comprising a magnetic balancer opposing the circumference of the rotor to secure magnetic balance between the rotor and the magnetic shield.

35. The inner rotor motor according to claim 34, the magnetic balancers and the stator all being symmetric with each other relative to a center of the rotor.

36. The inner rotor motor according to claim 34, further comprising notches accommodating the magnetic balancers and the stator, the notches being symmetric around a center of the rotor.

37. The inner rotor motor according to claim 12, further comprising a plurality of magnetic balancers opposing the circumference of the rotor to secure magnetic balance between the rotor and the stator.

38. The inner rotor motor according to claim 37, further comprising a chassis to which the rotor is rotatably installed and which is formed of a magnetic material, the magnetic balancers integral with the chassis.

39. The inner rotor motor according to claim 38, a circumferential length of the magnetic balancers being equal.

40. The inner rotor motor according to claim 39, further comprising a magnetic head, a first of the one of the plurality of segments being a magnetic shield to block magnetic flux of the magnetic poles from the magnetic head.

41. The inner rotor motor according to claim 37, the magnetic balancers each comprising a plurality of segments arranged in a circumferential direction of the rotor.

42. The inner rotor motor according to claim 41, a circumferential length of one of the plurality of segments in each magnetic balancer being equal to a circumferential length of two of the magnetic poles.

43. The inner rotor motor according to claim 42, a second of the one of the plurality of segments, the first of the one of the plurality of segments and the stator all being symmetric with each other relative to a center of the rotor.

* * * * *